US010846294B2

(12) United States Patent
Li et al.

(10) Patent No.: US 10,846,294 B2
(45) Date of Patent: Nov. 24, 2020

(54) DETERMINATION OF A RESPONSE TO A QUERY

(71) Applicant: ACCENTURE GLOBAL SOLUTIONS LIMITED, Dublin (IE)

(72) Inventors: Chung-Sheng Li, San Jose, CA (US); Benjamin Nathan Grosof, Mercer Island, WA (US); Madhura Shivaram, Bangalore (IN); Guanglei Xiong, Pleasanton, CA (US); Colin Connors, Campbell, CA (US); Kyle Patrick Johnson, San Francisco, CA (US); Emmanuel Munguia Tapia, San Jose, CA (US); Mingzhu Lu, San Jose, CA (US); Golnaz Ghasemiesfeh, Sunnyvale, CA (US); Tsunghan Wu, Seattle, WA (US); Neeru Narang, San Jose, CA (US); Sukryool Kang, Sunnyvale, CA (US); Kayhan Moharreri, San Jose, CA (US)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 185 days.

(21) Appl. No.: 16/037,856

(22) Filed: Jul. 17, 2018

(65) Prior Publication Data
US 2020/0026770 A1    Jan. 23, 2020

(51) Int. Cl.
*G06F 16/24* (2019.01)
*G06F 16/2457* (2019.01)
(Continued)

(52) U.S. Cl.
CPC .... *G06F 16/24578* (2019.01); *G06F 16/2379* (2019.01); *G06F 40/205* (2020.01);
(Continued)

(58) Field of Classification Search
None
See application file for complete search history.

(56) References Cited

U.S. PATENT DOCUMENTS 7,979,412 B2 * 7/2011 Johnson ................ G06F 16/289
                                                    707/706
8,175,878 B1  5/2012 Chelba et al.
(Continued)

OTHER PUBLICATIONS

Yann LeCun et al., "Deep learning" 436, Nature, vol. 521, May 28, 2015, 35 pages.
(Continued)

*Primary Examiner* — Alford W Kindred
*Assistant Examiner* — Cao D Vuong
(74) *Attorney, Agent, or Firm* — Mannava & Kang, P.C.

(57) ABSTRACT

A system for determining a response to a query includes a receiver to receive a query along with a plurality of potential responses to the query. A detector detects a topic and a type of the query based on information extracted from text and structure. Further, a selector selects at least one of a plurality of techniques for processing the query and the plurality of potential responses, based on the topic and the type of the query. An obtainer obtains an answer by execution of each of the selected techniques for processing the query and the plurality of potential responses along with an associated confidence score. A determinator determines one of obtained answers as a correct response to the query, based on a comparison between confidence scores associated with the answers.

18 Claims, 16 Drawing Sheets

(51) Int. Cl.
*G06F 16/23* (2019.01)
*G06F 40/30* (2020.01)
*G06F 40/205* (2020.01)
*G06N 3/04* (2006.01)
*G06N 3/08* (2006.01)

(52) U.S. Cl.
CPC ........... *G06F 40/30* (2020.01); *G06N 3/0445* (2013.01); *G06N 3/08* (2013.01)

(56) References Cited

U.S. PATENT DOCUMENTS

| | | | |
|---|---|---|---|
| 10,445,329 B2* | 10/2019 | Dispensa | G06F 16/24575 |
| 2006/0074873 A1* | 4/2006 | Dettinger | G06F 16/9032 |
| 2016/0125751 A1* | 5/2016 | Barker | G06F 16/951 |
| | | | 434/322 |
| 2017/0329784 A1 | 11/2017 | Dispense et al. | |
| 2018/0293241 A1* | 10/2018 | Chittar | G06N 20/00 |
| 2018/0307728 A1* | 10/2018 | Crupi | G06F 16/24553 |
| 2020/0042597 A1* | 2/2020 | Wu | G06F 40/20 |

OTHER PUBLICATIONS

Giosue Lo Bosco et al. "A Neural Network model for the Evaluation of Text Complexity", Postproceedings of the 9th Annual International Conference on Biologically Inspired Cognitive Architectures, BICA 2018 (Ninth Annual Meeting of the BICA Society), pp. 464-470.

* cited by examiner

DETERMINATION OF A RESPONSE TO A QUERY

TECHNICAL FIELD

The present disclosure relates to query resolution and, in particular, relates to systems and methods for determination of a response to a query.

BACKGROUND

In any organization, there are multiple facets that are to operate in tandem for smooth and focused operations while ensuring profitability. Accounting is one of those facets that play a major role in ensuring that the operations are in line with financial constraints and objectives of an organization. Usually, a number of people work in such divisions who are either Certified Public Accountants (CPA) and/or Certified Financial Advisors (CFA). In order to resolve any concern or issue that reaches them, for example, relating to revenue recognition or asset classification or liability classification, the CPAs and/or CFAs are required to refer to numerous accounting or auditing regulations, policies, and rules in order to make a well-informed decision. However, considering the enormous scope of the accounting realm and the manual decision-making process for resolving a query, the possibility of committing an error is significantly high. Moreover, due to the direct involvement of money in such transactions, even a small error can lead to huge loss to the organization and can consequently affect overall growth and development of the organization.

SUMMARY

In an example embodiment of the present disclosure, a system for determining response to a query is disclosed. The system includes a receiver, a detector, a selector, an obtainer, and a determinator. The receiver receives a query along with a plurality of potential responses to the query. The detector is in communication with the receiver, and detects a topic and a type of the query, based on information extracted from text and structure of the query and the plurality of potential responses. The query is one of a factoid query, a computational query, or a combination of both. Further, the selector is in communication with the detector, and selects at least one of a plurality of techniques for processing the query and the plurality of potential responses, based on the topic and the type of the query. The plurality of query processing techniques includes an information retrieval technique, an n-gram association technique, a deep learning technique, an inferencing technique, a generalized template framework technique, and a topic-specific technique. The obtainer is in communication with the selector to obtain an answer by execution of each of the selected techniques for processing the query and the plurality of potential responses along with an associated confidence score. The answer is from among the plurality of responses and the confidence score is indicative of an accuracy of the answer obtained by execution of a respective technique. Further, the determinator is in communication with the detector and the obtainer, and determines one of obtained answers as a correct response to the query, based on a comparison between confidence scores associated with the answers.

In another example embodiment of the present disclosure, a system for determining a response to a query is disclosed. The system includes a receiver, an extractor, a detector, a selector, an obtainer, a generator, and a determinator. The receiver receives a query along with a plurality of potential responses to the query. The extractor is in communication with the receiver, and extracts information from the query and the plurality of potential responses based on text and structure of the query and the plurality of potential responses, by using at least one Natural Language Processing (NLP) technique. The detector is in communication with the extractor, and detects a topic and a type of the query, based on the extracted information. The query is one of a factoid query, a computational query, or a combination of both. The selector is in communication with the detector, and selects at least one of a plurality of techniques for processing the query and the plurality of potential responses, based on the topic and the type of the query. The plurality of techniques includes an information retrieval technique, an n-gram association technique, a deep learning technique, an inferencing technique, a generalized template framework technique, and a topic-specific technique. The obtainer is in communication with the selector, and obtains an answer by execution of each of the selected techniques for processing the query and the plurality of potential responses. The answer is from among the plurality of potential responses. The generator is in communication with the selector and the obtainer, and generates a confidence score for each answer obtained by execution of each of the selected techniques. The confidence score is indicative of an accuracy of the answer obtained by execution of a respective technique. Further, the determinator is in communication with the extractor, the detector, and the obtainer, and determines one of the obtained answers as a correct response to the query, based on a comparison between confidence scores associated with the answers.

In yet another example embodiment of the present disclosure, a computer-implemented method, for determining a response to a query, executed by at least one processor, is disclosed. The method commences with receiving a query along with a plurality of potential responses to the query. Further, the method includes detecting a topic and a type of the query, based on information extracted from text and structure of the query and the plurality of potential responses. The query is one of a factoid query, a computational query, or a combination of both. At least one of a plurality of techniques is selected for processing the query and the plurality of potential responses, based on the topic and the type of the query. The plurality of techniques includes an information retrieval technique, an n-gram association technique, a deep learning technique, an inferencing technique, a generalized template framework technique, and a topic-specific technique. The method further includes obtaining an answer by execution of each of the selected techniques for processing the query and the plurality of potential responses along with an associated confidence score. The answer is from among the plurality of responses and the confidence score is indicative of an accuracy of the answer obtained by execution of a respective technique. One of the obtained answers is determined as a correct response to the query, based on a comparison between confidence scores associated with the answers.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
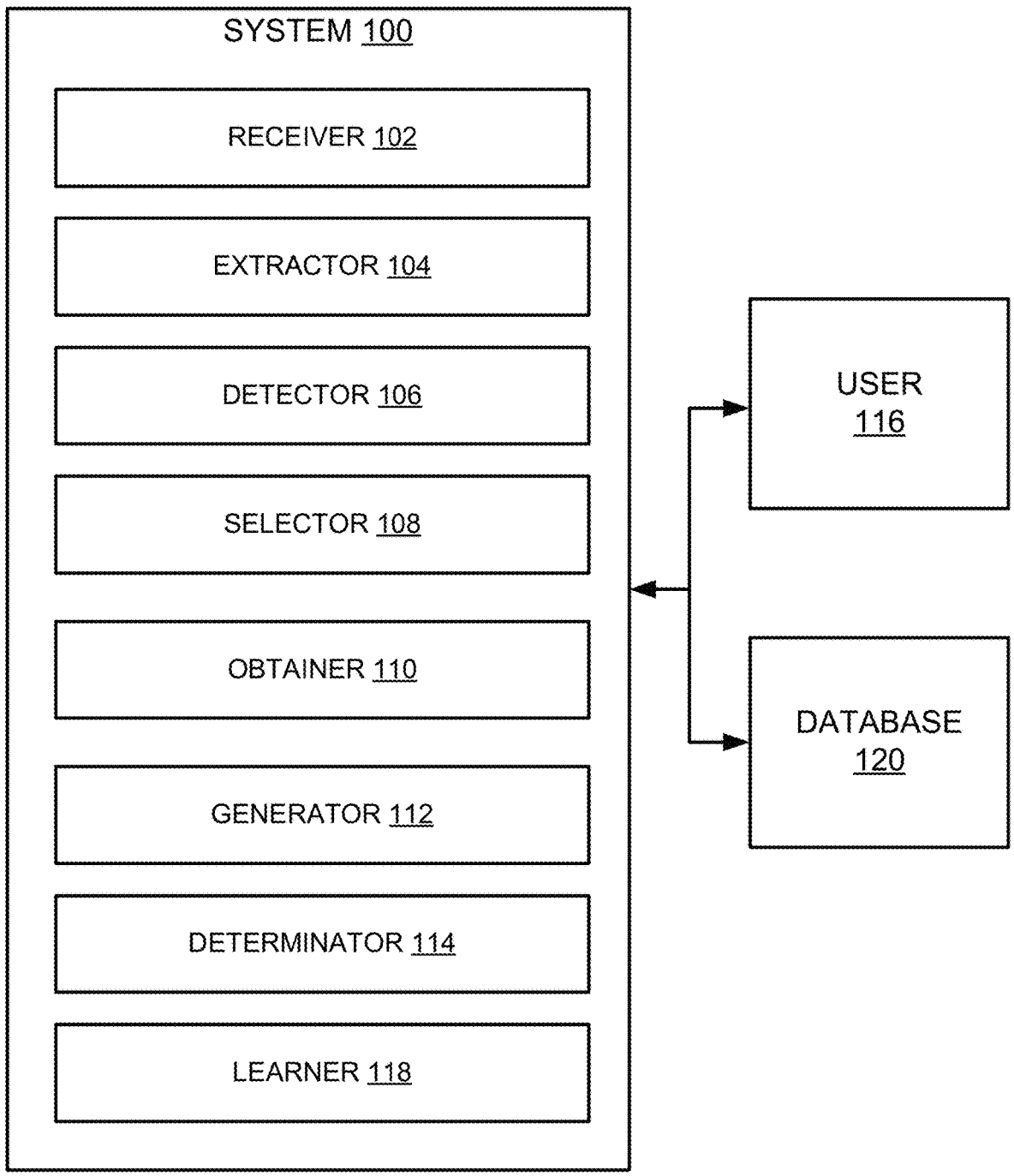
FIG. 1 illustrates a block diagram of a system for determination of a response to a query, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

In the realm of accounting and financial management, a number of people are employed in order to resolve any query or issue related to accounting that arises in regular operations of an organization. Such people usually possess certain qualifications in the corresponding field, such as a Certified Public Accountants (CPA) and Certified Financial Advisors (CFA) among others.

Generally, for resolving any such query, the CPAs and CFAs may have to refer to a number of accounting regulations, policies, and norms before being able to make a well-informed decision towards resolving the query. However, considering the manual intervention in decision-making, there exists a possibility of committing an error, which may eventually directly or indirectly affect operations of the organization. Therefore, the present instance is an extreme case of knowledge complexity as well as work complexity.

Further, query resolution is a time-intensive process owing to the manual nature of the decision-making process. Moreover, since different individual may each have different approaches to resolve the same problem, the query resolution may not be uniform across the board. For example, factors considered by one CPA may not be exactly the same as those considered by another CPA. in resolution of a similar query. Therefore, the entire process of query resolution lacks uniformity. Thus, the existing techniques of query resolution are error-prone, non-uniform, fragmented, and time-intensive.

The present subject matter describes systems and methods for determining a response to a query. According to an example embodiment of the present disclosure, a system may receive a query along with a plurality of potential responses to the query. In an example embodiment, the query may relate to accounting domain. However, one of ordinary skill in the art will appreciate that the disclosed techniques may be used to resolve queries in other domains as well such as, for example, healthcare, human resource management, legal, and the like.

Upon receipt of the query along with the potential responses, the system may detect a topic and a type of the query. The topic and the query may be detected based on information extracted from text and structure of the query and the potential responses. In an example embodiment, the query is one of a factoid query, a computational query, and a combination of both.

Further, the system may select at least one of a plurality of techniques for processing the query and the plurality of potential responses to determine the response to the query. A technique may be selected based on the topic and the type of the query. The techniques may include, but are not limited to, an information retrieval technique, an n-gram association technique, a deep learning technique, an inferencing technique, a generalized template framework technique, and a topic-specific technique.

Following the selection of at least one technique, the system may obtain an answer by execution of each of the selected techniques for processing the query and the potential responses. The answer is from among the potential responses received as options along with the query. The system may also obtain a confidence score associated with each answer. The confidence score is indicative of an accuracy of the answer obtained by execution of a respective technique.

The system may further determine one of the obtained answers as a correct response to the query, based on comparison between confidence scores associated with the answers. In an example embodiment, an answer with the highest confidence score may be determined as the correct response to the query.

In an example embodiment, the system may select a confidence score that is highest among confidence scores of the obtained answers. The highest confidence score may then be compared with a predefined threshold value for the confidence score. Further, the system may determine the answer associated with the highest confidence score as the correct response to the query, when the highest confidence score is above the predefined threshold value.

In an alternative example embodiment, when the highest score is below the predefined threshold value, the system may generate at least one request for obtaining additional information on at least one of the query and the potential responses. The request may be in form of at least one of a question to a user and a confirmation from the user. Based on a user response, the system may then update the confidence scores and proceed accordingly as discussed earlier.

Further, the system is capable of continuous and automatic self-learning as query resolution proceeds. Therefore, a determination of a response to a query may be used for subsequent determination of responses to subsequent queries of similar nature.

The present disclosure offers a comprehensive approach for determining a response to the query. Further, although the present disclosure is explained with respect to accounting domain, the system may be implemented in other domains as mentioned above with minor modifications to the architecture, without departing from the scope of the disclosure. Therefore, the system has a wide scope of implementation in various industries with minor modifications.

Additionally, the system assists a user in determining responses to queries and therefore, eliminates the possibility of committing errors. As a result, there is a significant improvement in accuracy of the determination of the responses in comparison to existing techniques. Further, owing to the self-learning capabilities of the system, accuracy of the determination of the correct response continuously improves with each cycle of query resolution. Moreover, due to the assisted determination of the responses to the queries, time required to resolve a query sign is significantly minimized. The system may act as a virtual assistant with advanced quantitative and qualitative reasoning capabilities, and possess a knowledge base to determine the responses to the queries. In addition, there is uniformity in determination of the responses as the system has a standardized approach to resolve the queries. Therefore, the present disclosure offers systems and methods for determination of responses to queries that are comprehensive, accurate, time-efficient, and uniform.

FIG. 1 illustrates a system 100 for determining response to a query, according to an example embodiment of the present disclosure. Although the functionality of the system 100 is explained with regard to accounting domain, it will be appreciated by a person skilled in the art that the system 100 can be implemented in any other domain with minor modifications, without departing from the scope of the present disclosure.

In an example embodiment, the system 100 may include a receiver 102, an extractor 104, a detector 106, a selector 108, an obtainer 110, a generator 112, and a determinator 114. The receiver 102, the extractor 104, the detector 106, the selector 108, the obtainer 110, the generator 112, and the determinator 114 may be in communication with each other.

The receiver 102 may receive a query along with a plurality of potential responses to the query. In an example embodiment, the query may relate to the accounting domain. Further, the potential responses may be provided as options to the query, and one of the options has to be selected as a correct response to resolve the query. The query and the potential responses may include, but is not limited to, text, numerals, alpha numerical, and a combination thereof.

Upon receipt of the query and the potential responses, the extractor 104 may extract information from the query and the potential responses based on text and structure of the query and the potential responses. In an example embodiment, the information may be extracted by using at least one Natural Language Processing (NLP) technique. In an example embodiment, the NLP technique may include, but is not limited to, a dependency parsing technique and a constituency parsing technique.

Based on the extracted information, the detector 106 may detect a topic and a type of the query. In the accounting domain, the topic may relate to, but is not limited to, auditing, financial accounting and reporting, regulation, and business environment and concepts. Further, the query may include, but is not limited to, a factoid query, a computational query, and a combination of both. The factoid query, the computational query, and a combination are the type of the query received.

Based on the topic and the type of the query, the selector 108 may select at least one of a plurality of techniques for processing the query and the potential responses to determine the response to the query. In an example embodiment, the techniques may include, but are not limited to, an information retrieval technique, an n-gram association technique, a deep learning technique, an inferencing technique, a generalized template framework technique, and a topic-specific technique. The techniques are explained in detail in subsequent sections of the specification.

Further, the obtainer 110 may obtain an answer by execution of each of the selected techniques for processing the query and the potential responses. The answer may be from among the potential responses. Therefore, the answer may be one of the potential responses received along with the query as options.

For each answer obtained by execution of each of the selected techniques, the generator 112 may generate a confidence score. The confidence score of an answer is indicative of an accuracy of the answer obtained by execution of a respective technique. In one example embodiment, the confidence score may be rated on a scale of 1 to 100. In another example embodiment, the confidence score may be rates as "poor", "average", "good", "very good", and "excellent."

Further, the determinator 114 may compare confidence scores associated with the answers, and determine one of obtained answers as a correct response to the query based on the comparison. In an example embodiment, the determinator 114 may select a confidence score that is highest among the confidence scores of the obtained answers. The highest confidence may then be compared with a predefined threshold value of the confidence score. In an example embodiment, when the highest confidence score is above the predefined threshold value, the determinator 114 may determine the answer associated with the highest confidence score as the correct response to the query.

For example, on a scale of 1 to 100, the threshold value may be defined as "85." When the highest confidence score of an answer is 85 or more, the determinator 114 may determine the answer as the correct response to the query.

In an alternate example embodiment, when the highest confidence score is below the predefined threshold value, the determinator 114 may generate at least one request for obtaining additional information on at least one of the query and the potential responses. The request may be generated in form of at least one of a question to a user 116 and a confirmation from the user 116. Therefore, either the determinator 114 may transmit a question to the user 116 or transmit information to the user 116 for confirmation.

Further, the receiver 102 may receive a user response to the request. The user may response may be received in form of an answer to the question sent or a confirmation in response to the information sent.

Based on the user response, the obtainer 110 may obtain an updated answer by execution of each of the selected techniques for processing the query and the potential responses. Therefore, the selected techniques may be executed again to generate updates answers based on the user response. The updated answer may be from among the potential responses. In an example embodiment, each of the selected techniques may be re-executed to account for the additional information received in form of the user response. In another example embodiment, not all the selected techniques may be re-executed and only those techniques may be re-executed which may be affected by the additional information. In yet another example embodiment, a technique, which may not have been selected before for processing of the query and the potential responses, may now be selected and executed to generate an answer in light of the receipt of the additional information.

Further, the generator 112 may generate an updated confidence score for each updated answer obtained by execution of each of the selected techniques. Based on a comparison between updates confidence scores associated with the updated answers, the determinator 114 may determine one of the updated answers as a correct response to the query.

Further, the system 100 may include a learner 118 in communication with the receiver 102 and the determinator 114. The learner 118 may receive a confirmation from the user 116 being indicative of correctness of the determined response. In an example embodiment, the user 116 may confirm that the determined response by the system 100 is correct. In another example embodiment, the user 116 may confirm that the determined response is not correct and may provide a corrected response to the query. Subsequently, the confirmation along with the correct response may be stored for assisting in the processing of subsequent queries.

In an example embodiment, the confirmation along with the correct response may be stored in a database 120 associated with the system 100. The database 120 may be an internal or an external repository. Any data pertaining to determination of the response to the query by the system 100 may be stored in the database 120.

Figure 2:
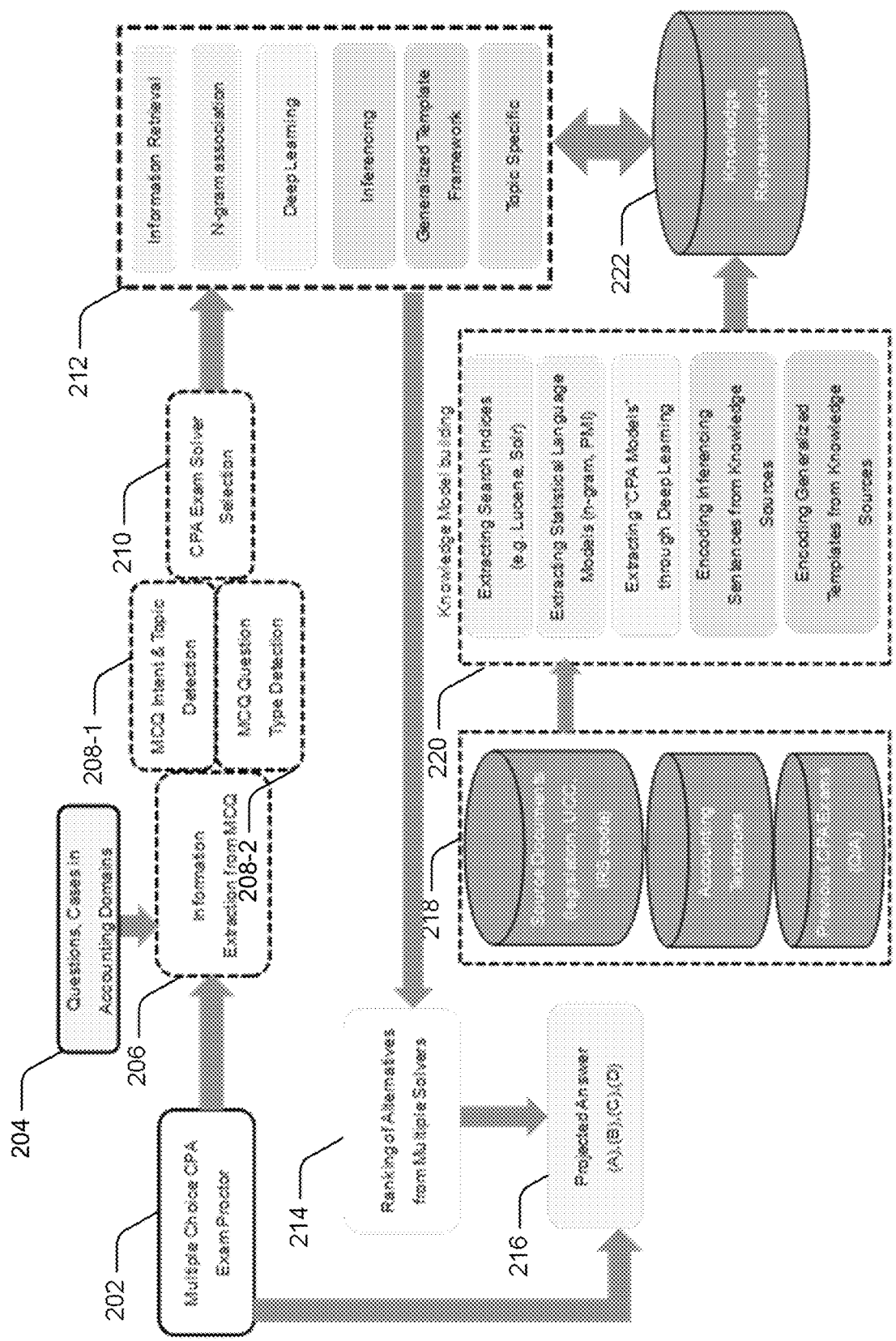
FIG. 2 illustrates a schematic view of the system, according to an example embodiment of the present disclosure.

FIG. 2 illustrates a schematic view of the system 100, according to an example embodiment of the present disclosure. For the sake of brevity, features of the system 100 that are already explained in detail in the description of FIG. 1 are not explained in detail in the description of FIG. 2. In FIG. 2, functioning of the system 100 is shown in the form of a block flow diagram for better understanding of the present subject matter. The blocks or components shown in FIG. 2 are a part of the components as shown in FIG. 1 itself, in one way or the other, without departing from the scope of the disclosure. In the present example embodiment, the system 100 may be implemented to assist the user 116 in solving an examination paper to qualify as a certified CPA.

The system 100 may include a block 202 that is indicative of a multiple choice CPA exam proctor, hereinafter referred to as proctor 202, a block 204 indicative of questions or cases in the accounting domain being presented to the user 116, a block 206 indicative of information extraction from multiple choice questions posed to the user 116, a block 208-1 indicative of intent and objective detection of the CPA exam, a block 208-2 indicative of a type detection of the question, a block 210 indicative of an exam solver technique selection, a block 212 indicative of the techniques, hereinafter referred to as techniques 212, available for processing the question, a block 214 indicative of ranking of the answers obtained by executing different techniques, and a block 216 indicative of determination of the correct response for the question. The system 100 may include a block 218 indicative of a source, hereinafter referred to as source 218, for building a knowledge model for the system 100, a block 220 indicative of building of the knowledge model for the techniques to process the question, and a block 222 indicative of knowledge representations from the knowledge base for being used by the techniques to provide the answer to the question.

The proctor 202 may act as a database for questions that may be presented to the user 116 in the CPA examination. In an example embodiment, the proctor 202 may include 4500 questions that appeared in CPA examinations being conducted from the year 1990 to the year 2015. The proctor 202 may include the questions along with the potential responses and may periodically be updated to include more questions and corresponding potential responses over a period of time. In an example embodiment, the proctor 202 may be a part of the database 120.

In an example embodiment, with regard to the accounting domain, the proctor 202 may include questions relating to professional responsibilities, evaluation, reporting, accounting and review services, audit sampling, auditing with technology, basic theory and financial reporting, inventory, fixed assets, present value, deferred taxes, stockholders' equity, investments, statement of cash flows, governmental accounting, not-for-profit accounting, legal responsibilities, federal securities acts, business structure, contracts, sales, commercial papers, bankruptcy, agency, property, individual taxation, partnership taxation, corporate taxation, debtor-creditor relationship, information technology, economics, performance measures, cost measurement, and financial risk management and capital budgeting.

The user 116 may access the questions from the proctor 202 using a web service. In an example embodiment, the user 116 may use login credentials to access the questions. The login credentials may include, but are not limited to, a user ID and a password.

Figure 3:
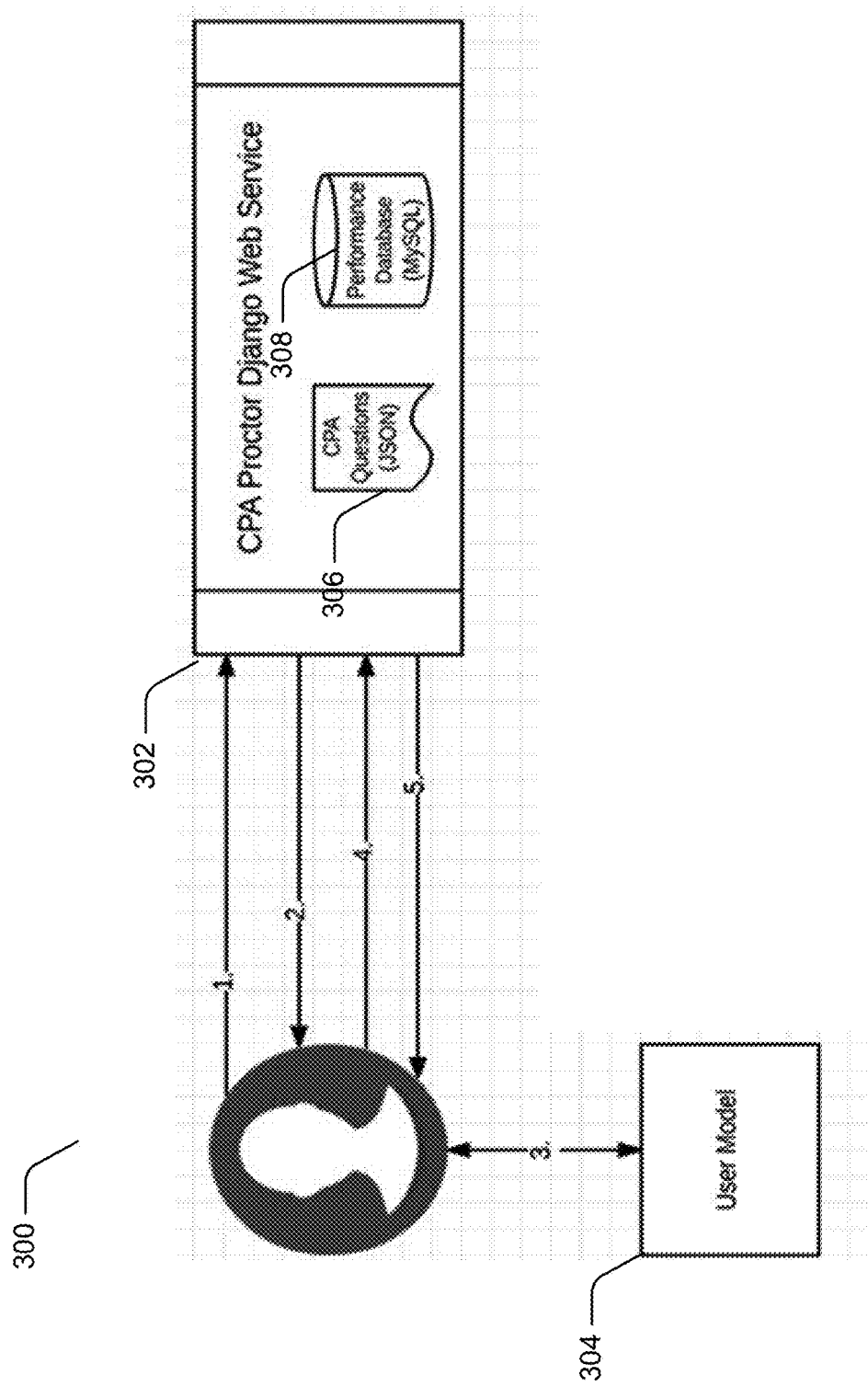
FIG. 3 illustrates a CPA proctor web service architecture for depicting an interaction of a user with a proctor of the system, according to an example embodiment of the present disclosure.

FIG. 3 illustrates a CPA proctor web service architecture 300 for depicting an interaction of the user 116 with the proctor 202, according to an example embodiment of the present disclosure. The CPA proctor web service architecture 300 may hereinafter be referred to as architecture 300.

In general practice, the architecture 300 may include the user 116, the CPA proctor Django web service 302, hereinafter referred to as web service 302, and a user model 304. The user 116 may interact with the proctor 202 through the web service 302. The web service 302 may further include CPA questions 306 and a performance database 308.

The user 116 may login to the proctor 202 through the web service 302 using the login credentials. Upon login, the user 116 may be assigned with a test ID. The user 116 may then invoke a request to receive a random sample of questions from the CPA questions 306. In response, the user 116 may receive a random sample of questions with corresponding potential responses. In an example embodiment, the questions may be irreplaceable, i.e., the questions cannot be swapped with a new set of questions. Further, the proctor 202 may tag the sample of questions with the test ID of the user 116.

The user 116 may then execute the user model 304 to generate answers to the questions. Once the answers are generated, the user 116 may invoke another request to the web service 302 to submit the answers to the questions for evaluation. Subsequently, a performance metrics for the user 116 may be computed and stored in the performance database 308 for historical review. The user 116 may inspect performance of previous login sessions for knowing details, such as accuracy scores for each test and questions that are answered incorrectly.

Figure 4:
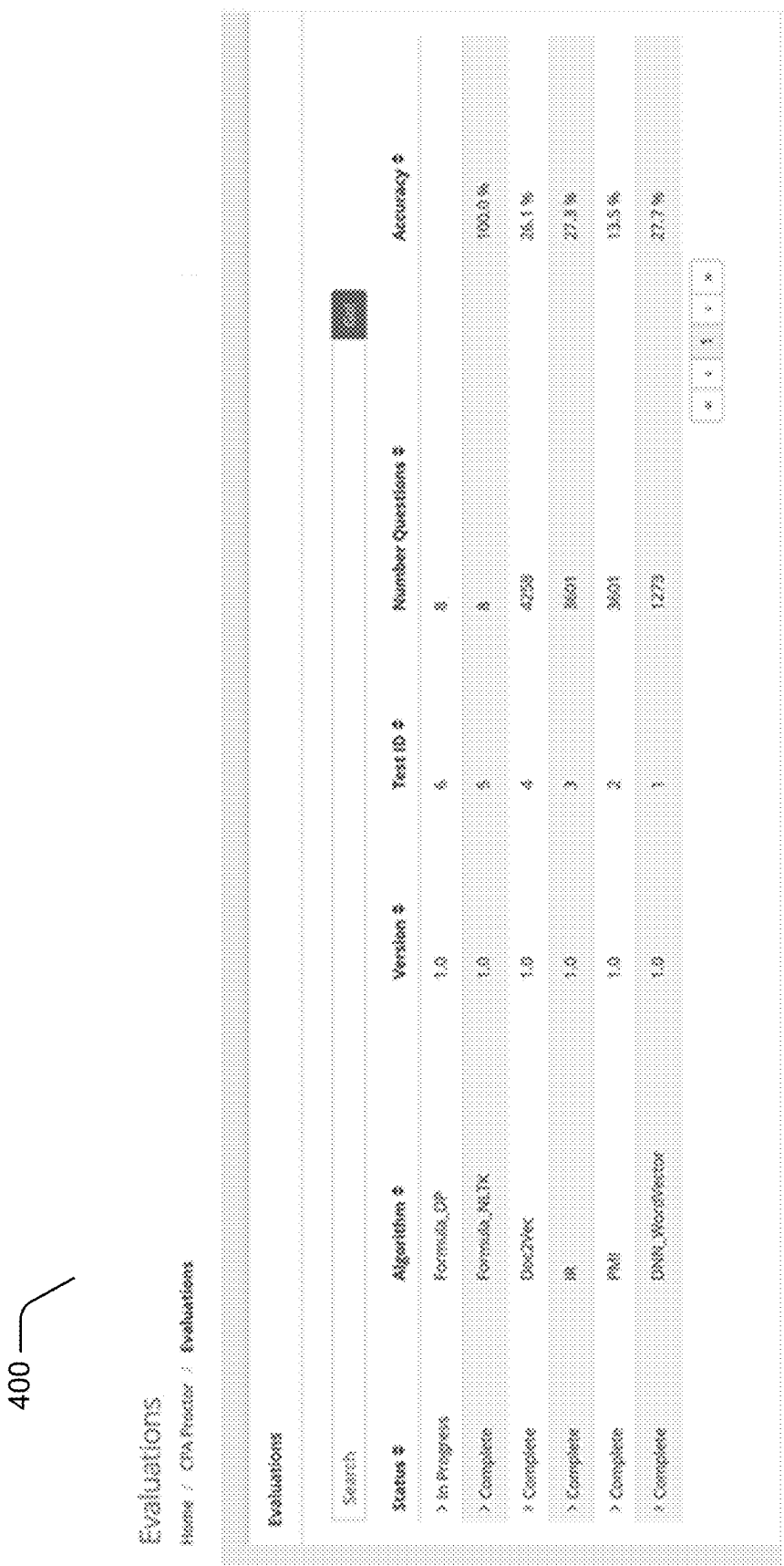
FIG. 4 illustrates a user interface for inspecting performances in previous login sessions of a user, according to an example embodiment of the present disclosure.

FIG. 4 illustrates a user interface 400 for inspecting performances in previous login sessions, according to an example embodiment of the present disclosure. As shown, the user 116 can inspect status, algorithm, version, test ID, number of questions answered, and accuracy of responses for each login session. This would allow to user to evaluate the user's performance.

Referring back to FIG. 2, the questions or cases in the accounting domain at block 204 may be received by the receiver 102 of the system 100. Specifically, the questions or cases may be retrieved from the proctor 202. Upon receipt of the questions, the extractor 104 may extract information from the questions. FIG. 5, FIG. 6, FIG. 7, and FIG. 8 illustrate extraction of the information from the questions and the potential responses.

Figure 5:
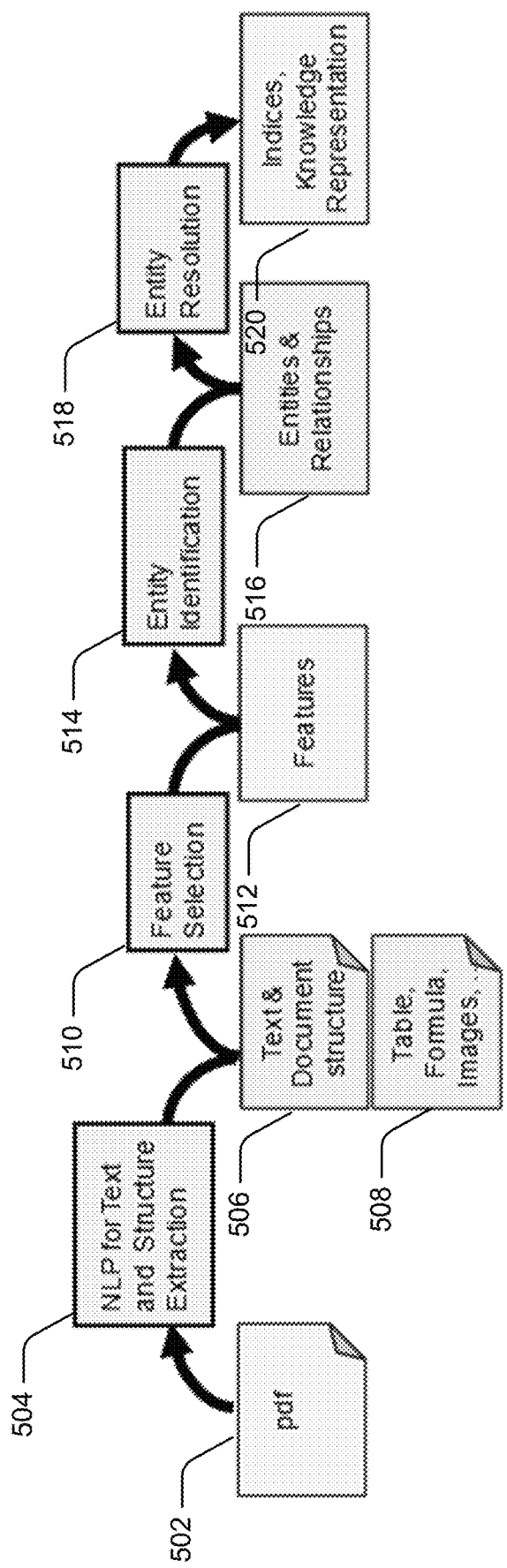
FIG. 5 illustrates an overview schematic view of extraction of information by an extractor of the system, according to an example embodiment of the present disclosure.

FIG. 5 illustrates an overall schematic view of extraction of information by the extractor 104 of the system 100, according to an example embodiment of the present disclosure. In an example embodiment, the extractor 104 may receive a PDF version of the question and the potential responses at block 502.

The extractor 104 may use NLP techniques to extract the PDF version in form of text and structure at block 504. After extraction, the PDF may be converted in the form of text and document structure at block 506 and tables, formulae, and images at block 508. Based on the text and document structure, the tables, the formulae, and the images, the extractor 104 may select features of the PDF at block 510 and block 512. From the features, the extractor 104 identifies entities included in the PDF at block 514. Based on the identification, relationships between the entities may also be established at 516. Further, the extractor 104 may perform entity resolution based on the relationships at block 518 to generate indices and knowledge representation at block 520. Therefore, the extractor 104 performs operations, such as named entity recognition, relation extraction, event extraction, sentiment extraction, co-reference resolution, and table extraction to accomplish extraction of the information from the questions along with the potential responses.

Figure 6:
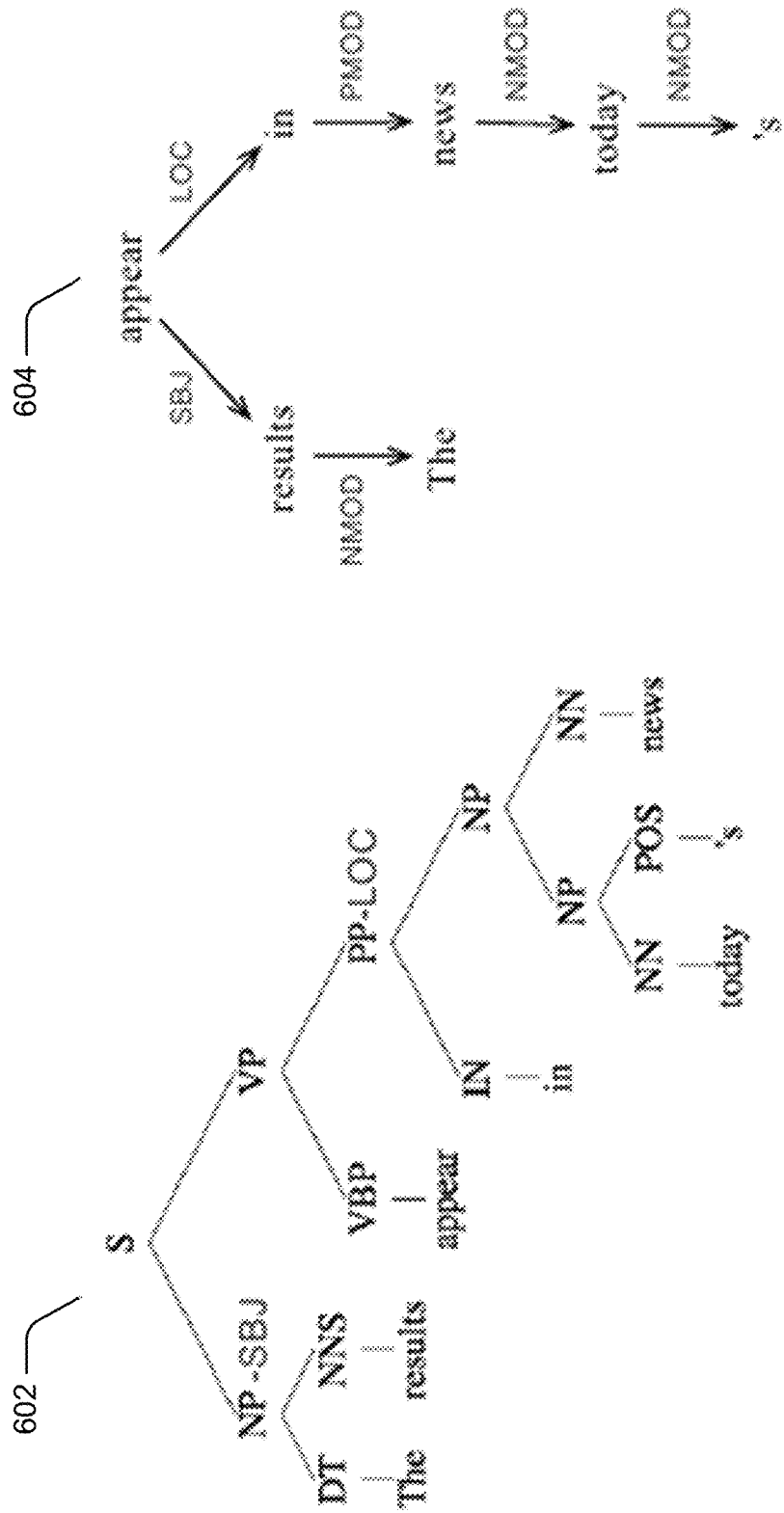
FIG. 6 illustrates a dependency parsing graph and a constituency parsing graph as formed by the extractor of the system, according to an example embodiment of the present disclosure.

In an example embodiment, the NLP technique used by the extractor 104 to extract the information may include, but is not limited to, dependency parsing and constituency parsing. FIG. 6 illustrates a dependency parsing graph 602 and a constituency parsing graph 604, according to an example embodiment of the present disclosure.

As shown, in the dependency parsing, structure starts with vertices, also referred to as tokens. Further, the dependency parsing graph 602 is formed by adding edges, also referred to as arcs, between the vertices. On the other hand, the constituency parsing graph 604 starts with bottom level constituents, also referred to as tokens. The constituency parsing graph 604 is formed by grouping smaller constituents into bigger constituents, also referred to as phrases.

Figure 7:
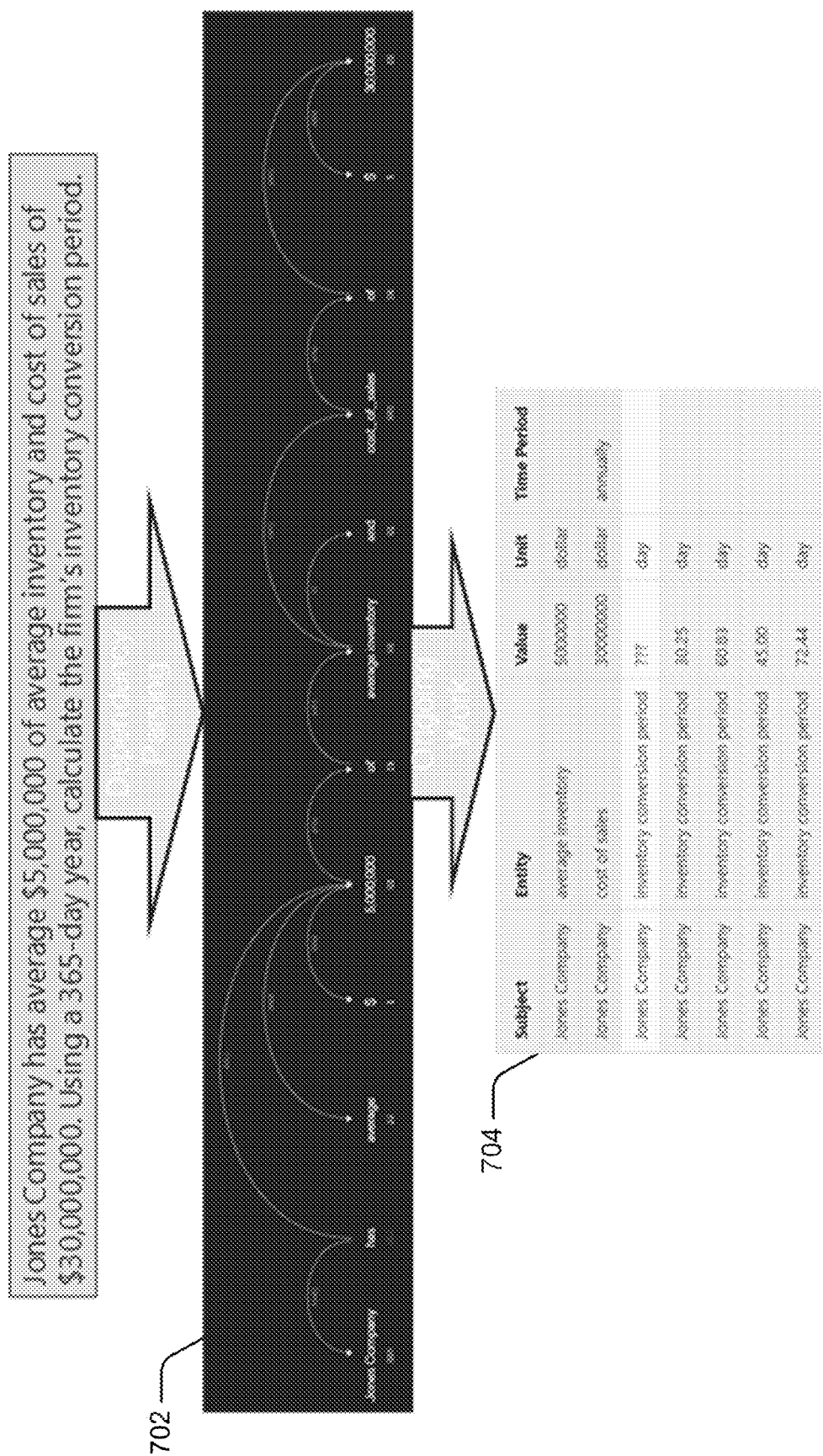
FIG. 7 illustrates entity resolution by dependency parsing as performed by the extractor of the system, according to an example embodiment of the present disclosure.

FIG. 7 illustrates entity resolution by dependency parsing as performed by the extractor 104 of the system 100, according to an example embodiment of the present disclosure. As shown, the extractor 104 may extract information from a question, i.e., "Jones company has average $5,000,000 of average inventory and cost of sales of $30,000,000. Using a 365-day year, calculate the firm's inventory conversion period."

The extractor 104 may form a dependency parsing graph 702 for the question. Additionally, the extractor 104 may generate a table 704 depicting the extraction of information from the dependency parsing graph 702.

Figure 8:
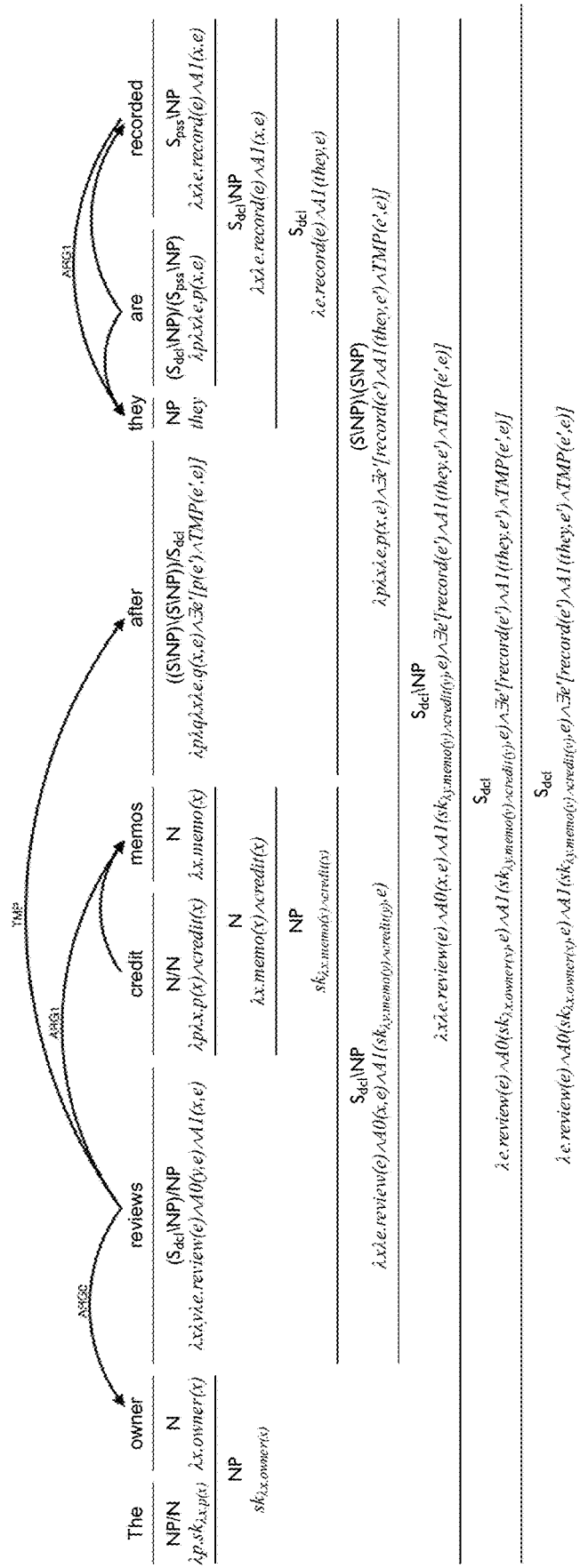
FIG. 8 illustrates a semantic parsing graph formed by the extractor for extracting information from a response to the question, according to an example embodiment of the present disclosure.

FIG. 8 illustrates a semantic parsing graph 800 formed by the extractor 104 for extracting information from a response to the question, according to an example embodiment of the present disclosure. As shown, the semantic parsing graph 800 indicates relationships between entities of the response along with corresponding equations formed to extract the information.

The semantic parsing graph 800 may be generated, based on dependency grammar of a sentence. For determining the dependency grammar of the sentence, the extractor 100 may detect a syntactic structure of the sentence in the form of words forming the sentence and an associated set of directed binary grammatical relationships among the words. Based on the semantic parsing graph 800, the extractor 104 may extract information pertaining modification of an entity by other entities.

Referring back to FIGS. 1 and 2, the detector 106 may detect an intent and objective of the CPA exam at block 208-1. The system 100 covers a number of compliance standards, which may include, but are not limited to, International Standards on Auditing (ISAs), U.S. auditing standards, IFAC Code of Ethics for Professional Accountants, Code of Professional Conduct—American Institute of CPAs (AICPA), Code of Ethics for Professional Accountants— International Federation of Accountants (IFAC), Requirements related to issuers, including the Public Company Accounting Oversight Board (PCAOB), the SEC and the Sarbanes-Oxley Act of 2002, Titles II and III, Section 303, General role, structure, and requirements of the PCAOB (Title I and Title IV of the Sarbanes-Oxley Act of 2002), AICPA Statements on Standards for Tax Service Treasury Department Circular 230, Internal Revenue Code of 1986, rules and regulations for tax return preparers, Uniform Commercial Code, Federal Securities regulations, Antitrust, copyright, patents, money-laundering, labor, employment, and ERISA, US General Accounting and Auditing Principles and International Financial Reporting Standards, Regulatory reporting requirements (Forms 10-Q, 10-K, Annual Report), Committee of Sponsoring Organizations of the Treadway Commission, and Sarbanes Oxley Act of 2002.

The detector 106 may detect a number of objectives of the CPA exam. For example, content and skill specification for auditing may include, but is not limited to, performing procedures to assess the control environment, including consideration of the COSO framework and identifying entity-level controls, obtaining and documenting an understanding of business processes and information flows, determining the effect of information technology on the effectiveness of an entity's internal control, performing risk assessment procedures to evaluate the design and implementation of internal controls relevant to an audit of financial statements, identifying key risks associated with general controls in a financial IT environment, identifying key risks associated with application controls in a financial IT environment, assessing whether the entity has designed controls to mitigate key risks associated with general controls or application functionality, identifying controls relevant to reliable financial reporting and the period-end financial reporting process, considering limitations of internal control, considering the effects of service organizations on internal control, and considering the risk of management override of internal controls.

Similarly, the content and skill specification of financial accounting and reporting may include, but are not limited to, identifying and understanding the differences between financial statements prepared on the basis of accounting principles generally accepted in the United States of America (U.S. GAAP) and International Financial Reporting Standards (IFRS), preparing and/or reviewing source documents including account classification and entering data into subsidiary and general ledgers, calculating amounts for financial statement components, reconciling the general ledger to the subsidiary ledgers or underlying account details, preparing account reconciliation and related schedules, analyzing accounts for unusual fluctuations and make necessary adjustments, preparing consolidating and eliminating entries for the period, identifying financial accounting and reporting methods and selecting those that are appropriate, preparing consolidated financial statements including balance sheets, income statements, and statements of retained earnings, equity, comprehensive income, and cash flows, preparing appropriate notes to the financial statements, analyzing financial statements including analysis of accounts, variances, trends, and ratios, exercising judgment in application of accounting principles, applying judgment to evaluate assumptions and methods underlying estimates including fair value measures of financial statement components, producing required financial statement filings in order to meet regulatory or reporting requirements, and determining appropriate accounting treatment for new or unusual transactions and evaluate the economic substance of transactions in making the determinations.

Further, the content and skill specification for regulation may include, but are not limited to, identifying situations that might be unethical or a violation of professional standards, performing research and consultations as appropriate and determining the appropriate action, recognizing potentially unethical behavior of clients and determining the impact on the tax services being performed, demonstrating importance of identifying and adhering to requirements, rules, and standards that are established by licensing boards within their state and which may place additional professional requirements specific to their state of practice, applying business law concepts in evaluating the economic substance of client transactions including purchase agreements, loans and promissory notes, sales contracts, leases, side agreements, commitments, contingencies, and assumption of liabilities, evaluating the legal structure of an entity to determine the implications of applicable laws and regulations on how a business is organized, governed, and operates, evaluating the tax implications of different legal structures for business entities, applying analytical reasoning tools to assess how taxes affect economic decisions related to the timing of income/expense recognition and property transactions, considering the impact of multi-jurisdictional tax issues on federal taxes, identifying differences between tax and financial accounting, analyzing information and identify data relevant for tax purposes, identifying issues, elections, and alternative tax treatments, researching issues and alternative tax treatments, formulating conclusions, preparing documentation to support conclusions and tax positions, and researching relevant professional literature.

Furthermore, the content and skill specification for business environment and concepts may include, but are not limited to, demonstrating an understanding of globalization on the business environment, distinguishing between appropriate and inappropriate governance structures within an organization, assessing impact of business cycles on an entity's industry or business operations, applying knowledge of changes in global economic markets in identifying the impact on an entity in determining its business strategy and financial management policies including managing the risks of inflation, deflation, commodity costs, credit defaults, interest rate variations, currency fluctuation, and regulation, assessing factors influencing a company's capital structure, including risk, leverage, cost of capital, growth rate, profitability, asset structure, and loan covenants, evaluating assumptions used in financial valuations to determine their reasonableness, determining business reasons for and explain underlying economic substance of transactions and corresponding accounting implications, identifying information systems within a business that are used to process and accumulate transactional data as well as providing monitoring and financial reporting information, distinguishing between appropriate and inappropriate internal control systems including system design, controls over data, transaction flow, wireless technology, and internet transmissions, evaluating whether there is appropriate segregation of duties, levels of authorization, and data security in an organization to maintain an appropriate internal control structure, obtaining and documenting information about an organization's strategic planning processes to identify key components of the business strategy and market risks, developing a time-phased project plan showing required activities, task dependencies, and required resources to achieve a specific deliverable, identifying the business and operational risks inherent in an entity's disaster recovery/business continuity plan, and evaluating business operations and quality control initiatives to understand its use of best practices and ways to measure and manage performance and costs.

In an example embodiment, the detector 106 may detect the type of question at the block 208-2. Table 1 and Table 2 depict the type of questions, according to an example embodiment of the present disclosure. Table 1 and Table 2 are provided for better understanding and clarity of the present subject matter, and should not be construed as limiting.

TABLE 1

| Question Type | Example |
|---|---|
| Simple Factoid | Which of the following bodies issue permits to practice for CPAs?<br>a. The AICPA.<br>b. The SEC.<br>c. The state boards of accountancy.<br>d. The PCAOB. |

TABLE 1-continued

| Question Type | Example |
| --- | --- |
| Simple Factoid with Negation | Which of the following is not an accurate statement about the requirements of the AICPA Uniform Accountancy Act (UAA)?<br>a. The UAA requires all accountants to be licensed.<br>b. The UAA contains requirements for the issuance of CPA certificates.<br>c. The UAA contains a substantial equivalency provision to allow for movement between states.<br>d. The UAA contains provisions for continuing education. |
| Complex Factoid Question | A CPA is permitted to disclose confidential client information without the consent of the client to<br>I. Another CPA who has purchased the CPA's tax practice.<br>II. Another CPA firm if the information concerns suspected tax return irregularities.<br>III. A state CPA society voluntary quality control review board.<br>a. I and III only.<br>b. II and III only.<br>c. II only.<br>d. III only. |

TABLE 2

| Question Type | Example |
| --- | --- |
| Simple Case | Thorp, CPA, was engaged to audit Ivor Co.'s financial statements. During the audit, Thorp discovered that Ivor's inventory contained stolen goods. Ivor was indicted and Thorp was subpoenaed to testify at the criminal trial. Ivor claimed accountant-client privilege to prevent Thorp from testifying. Which of the following statements is correct regarding Ivor's claim?<br>a. Ivor can claim an accountant-client privilege only in states that have enacted a statute creating such a privilege.<br>b. Ivor can claim an accountant-client privilege only in federal courts.<br>c. The accountant-client privilege can be claimed only in civil suits.<br>d. The accountant-client privilege can be claimed only to limit testimony to audit subject matter. |
| Complex Case (with calculation) | Price owns 2,000 shares of Universal Corp.'s $10 cumulative preferred stock. During its first year of operations, cash dividends of $5 per share were declared on the preferred stock but were never paid. In the second year, dividends on the preferred stock were neither declared nor paid. If Universal is dissolved, which of the following statements is correct?<br>a. Universal will be liable to Price as an unsecured creditor for $10,000.<br>b. Universal will be liable to Price as a secured creditor for $20,000.<br>c. Price will have priority over the claims of Universal's bond owners.<br>d. Price will have priority over the claims of Universal's unsecured judgment creditors. |

Figure 9:
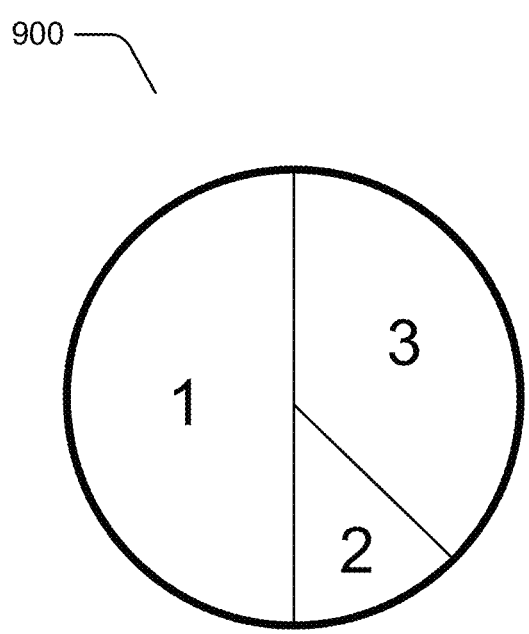
FIG. 9 illustrates a pie chart indicating distribution of questions in a module, according to an example embodiment of the present disclosure.

The detector 106 may then detect the topic of the question. In an example embodiment, the detector 106 may detect the topic of a module. The module may include 9 classes for 8 topics and 1 other topic. The topics may include, but are not limited to, cash conversion cycle, cash management, economic order quantity, cost of not taking a trade discount, interest rate with compensating balance, interest rate with discount note, dividend-yield-plus-growth approach, and weighted average cost of capital. In an example embodiment, the topic may include 28 computational questions which may further include 18 Elementary Computational Questions (ECQ) and 10 non-elementary computational questions. The other topic may include 7 non-ECQ. FIG. 9 illustrates a pie chart 900 indicating distribution of ECQs in the module, according to an example embodiment of the present disclosure. A portion "1" of the pie chart 900 indicates ECQs in the module. Furthermore, a portion "2" along with a portion "3" indicates non-ECQs. Furthermore, the portion "1" and the portion "2" indicate questions with certain topics whereas the portion "3" indicates questions with other topics.

Further, the selector 108 may select one of the techniques for processing the question and the corresponding responses at the block 210. Further, at the block 212, the techniques are enlisted as separate sub-blocks for illustrative purposes. As mentioned earlier, the techniques may include, but are not limited to, the information retrieval technique, the n-gram association technique, the deep learning technique, the inferencing technique, the generalized template framework technique, and the topic-specific technique. Each of these techniques is explained in detail in subsequent sections of the specification.

Information Retrieval Technique

In an example embodiment, the receiver 102 may receive the question with corresponding potential responses as:

"Under the antifraud provisions of Section 10(b) of the Securities Exchange Act of 1934, a CPA may be liable if the CPA acted
    a. Negligently.
    b. With independence.
    c. Without due diligence
    d. Without good faith."

In an example embodiment, the question may be constructed using option d, i.e., "without good faith." The system 100 may generate a code for each question-answer pair. For example, the system 100 may generate a code as "Under the antifraud provisions of Section 10(b) of the Securities Exchange Act of 1934, a CPA may be liable if the CPA acted Without^6 good^6 faith^6." "^6⇋ in the code may indicative of an answer string being boosted six times.

The system 100 may retrieve a passage that matches the code and may generate a relevance Score, equivalent to the confidence score. In an example embodiment, the system 100 may generate the confidence score as 0.58. The passage may be as follows:

"The plaintiff (purchaser or seller) must prove (a) That damages were incurred. (b) There was a material misstatement or omission on report (usually Form 10-K) filed with SEC. (c) The plaintiff read and relied on defective report. (2) Then the burden of proof is shifted to the accountant who may escape liability by proving s/he acted in good faith. (a) Although basis of liability here is not negligence, an accountant who has been grossly negligent typically will not be able to establish good faith. (b) An accountant who has been only negligent will probably be able to establish good faith."

N-Gram Association Technique

The system 100 may use a Pointwise Mutual Information (PMI) pipeline technique for generation of n-grams for the question and the corresponding responses. For a given question and a response, the system 100 may enumerate n-grams of the question and the response. The system 100 may detect unigrams, bi-grams, and tri-grams. In an example embodiment, the system 100 may detect the tri-grams and ignore the bi-grams. Further, the system 100 may ignore any n-grams with stop words. In an example embodiment, the system 100 may detect a stop word in middle of the tri-grams.

In an example embodiment, the question and the response may be "Which of the following is not a security under the definition for the securities act of 1933?" and "Bond certificate of interest", respectively. The system 100 may detect "securities", "security", "definition", "1933", and "act" as unigrams, ("securities", "act") as a bi-gram, and ("act", "of", "1933") as the tri-gram while ignoring ("act", "1933") as the bi-gram in the question. Further, in the response, the system 100 may detect "bond", "certificate", and "interest" as unigrams, ("bond", "certificate") as a bi-gram, and ("certificate", "of", "interest") as the tri-gram.

The PMI may capture a ratio of observed co-occurrence of two n-grams (within a window w in corpus) to an expected co-occurrence. A larger PMI may be indicative of a stronger association between two n-grams x and y:

$$PMI(x, y) = \log \frac{p(x, y)}{p(x)p(y)}$$

The system 100 may generate matrix of the n-grams in the question and each candidate answer, and compute PMI for each combination. The system 100 may then determine mean over PMIs. The system 100 may generate 4 PMI features, one for each of 4 types of n-grams as shown in Table 3. Table 3 is provided for better understanding and clarity of the present subject matter, and should not be construed as limiting.

TABLE 3

| | 'bond' | ... | ('bond, certificate') | ... | ('certificate', 'of' 'interest) |
|---|---|---|---|---|---|
| 'securities' | | | | | |
| ... | | | | | |
| ('securities', 'act') | | | $PMI_{ij}$ | | |
| ... | | | | | |
| ('act', 'of', '1933'), | | | | | |

Deep Learning Technique

In an example embodiment, the system 100 may use the deep learning technique based Question-Answer ("QA") for a case law. The system 100 may use human-generated summaries and automated procedures, for example, Cloze procedure, to generate a large corpus of questions and answers. The system 100 may train a Long Short Term Memory (LSTM) with attention on the corpus to obtain a QA solver for such questions.

An example of a human-generated summary may be as follows: "In consolidated cases brought by 1,000 victims of Iran-sponsored acts of terrorism, their estate representatives, and surviving family members seeking to obtain assets held in a New York bank account owned by the Central Bank of Iran, the Second Circuit's decision that 22 USC section 8772—which requires a court, before allowing execution against these assets, to determine whether Iran holds equitable title to, or the beneficial interest in, the assets—permissibly changed the law applicable in a pending litigation, is affirmed where Section 8772 does not violate the separation of powers."

Figure 10:
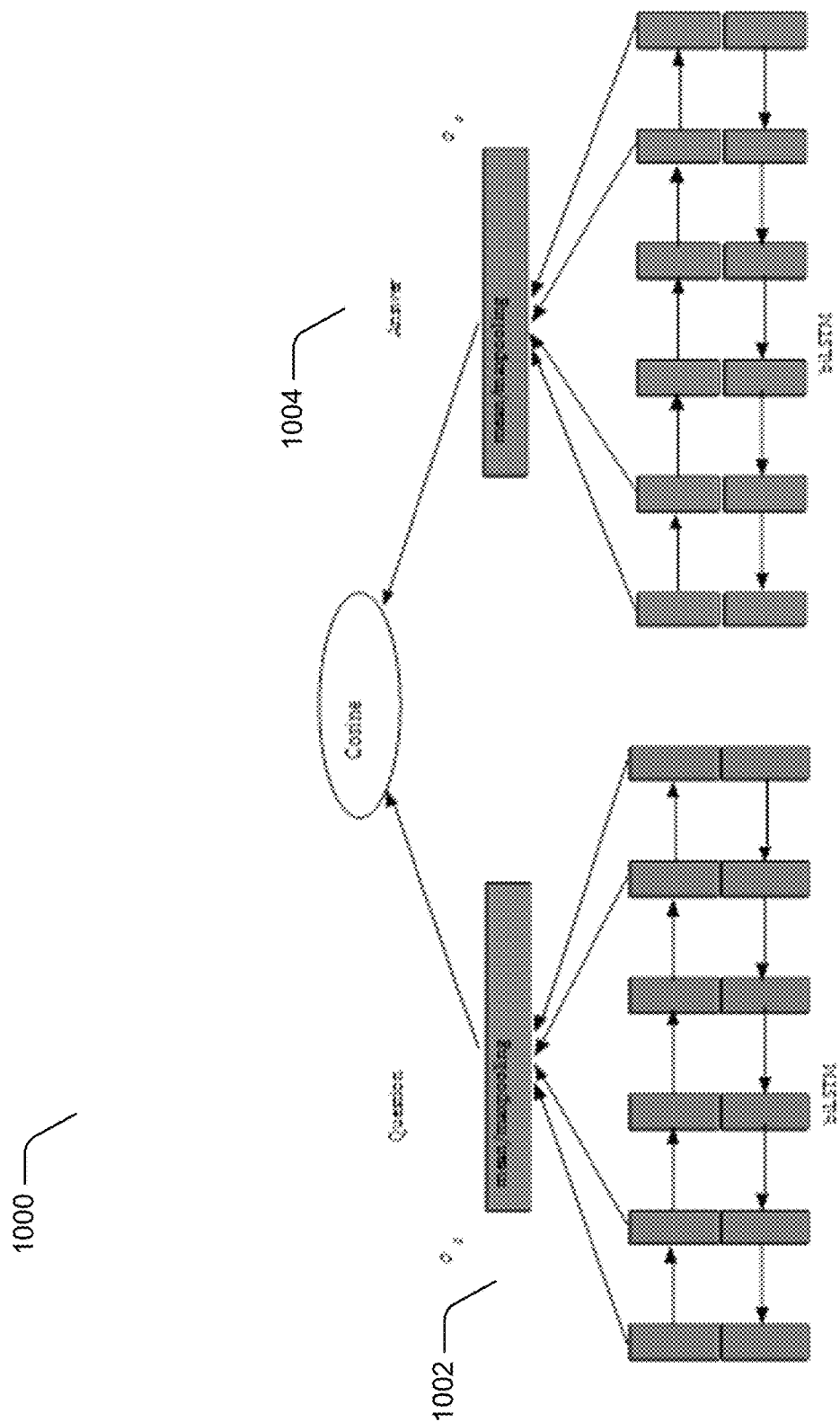
FIG. 10 illustrates a flow chart indicating question answering performed by the system using Long Short Term Memory (LSTM), according to an example embodiment of the present disclosure.
Figure 11:
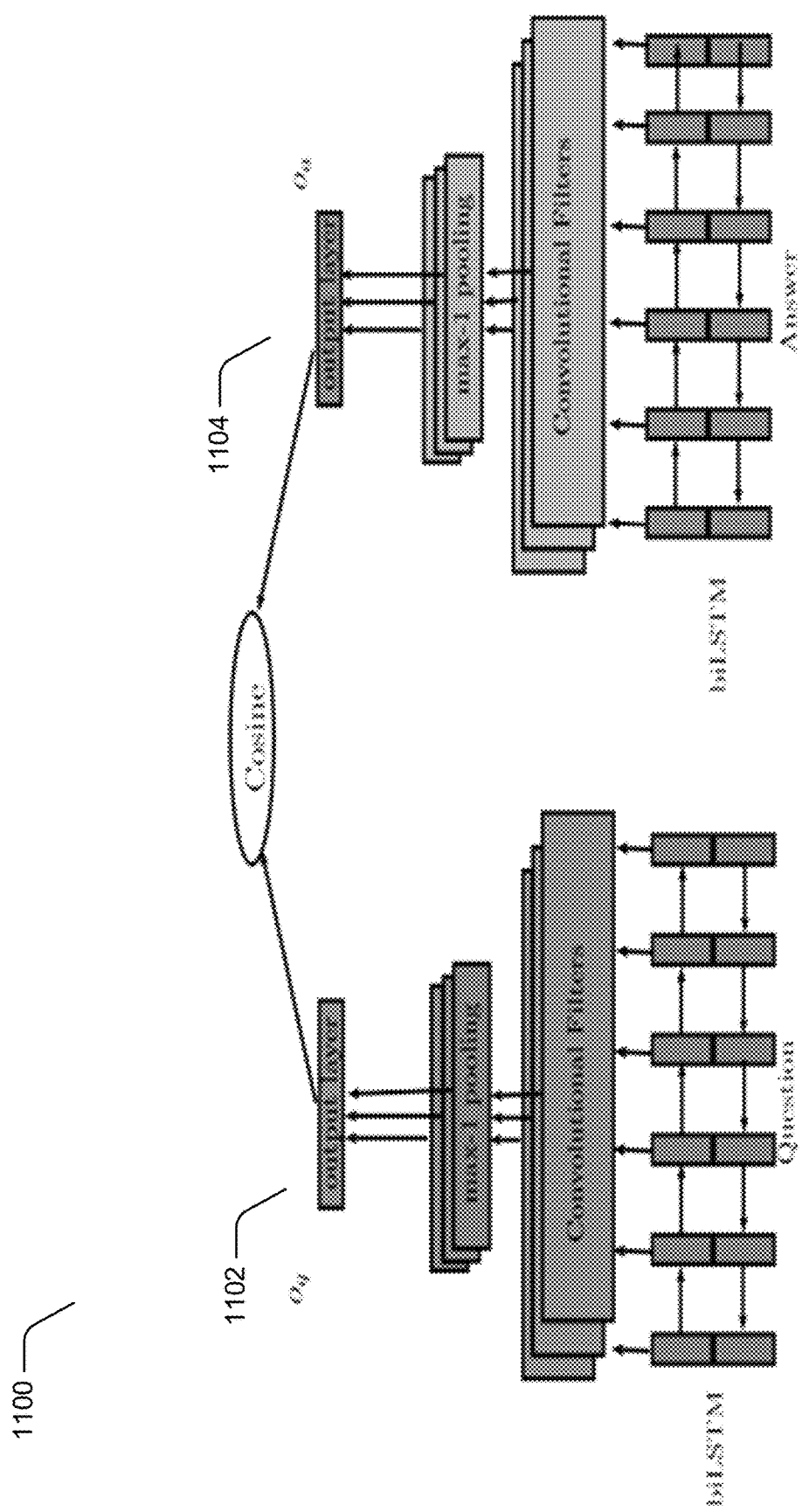
FIG. 11 illustrates a flow chart indicating question answering performed by the system using LSTM/Convolutionary Neural Network (CNN), according to an example embodiment of the present disclosure.

FIG. 10 illustrates a flow chart 1000 indicating question answering performed by the system 100 using LSTM, according to an example embodiment of the present disclosure. FIG. 11 illustrates a flow chart 1100 indicating question answering performed by the system 100 using LSTM/Convolutionary Neural Network (CNN), according to an example embodiment of the present disclosure.

Referring to FIG. 10 and FIG. 11, in an example embodiment, the system 100 may receive a query as "what is it called for a length of time between acquisition of inventory and payment for it" along with potential responses that may include, but are not limited to, "inventory conversion period", "operating cycle", "account receivable period", and "account payable deferral period." In such an example embodiment, the system 100 may process the query as a string of words as indicated by portion 1002 and 1102 in FIG. 10 and FIG. 11, respectively. Further, the system 100 may process the potential answers as indicated by portion 1004 and 1104 in FIG. 10 and FIG. 11, respectively. Based on the technique as indicated in the flow charts 1000 and 1100, the system 100 may determine a correct response for the query, for example, "inventory conversion period."

Figure 12:
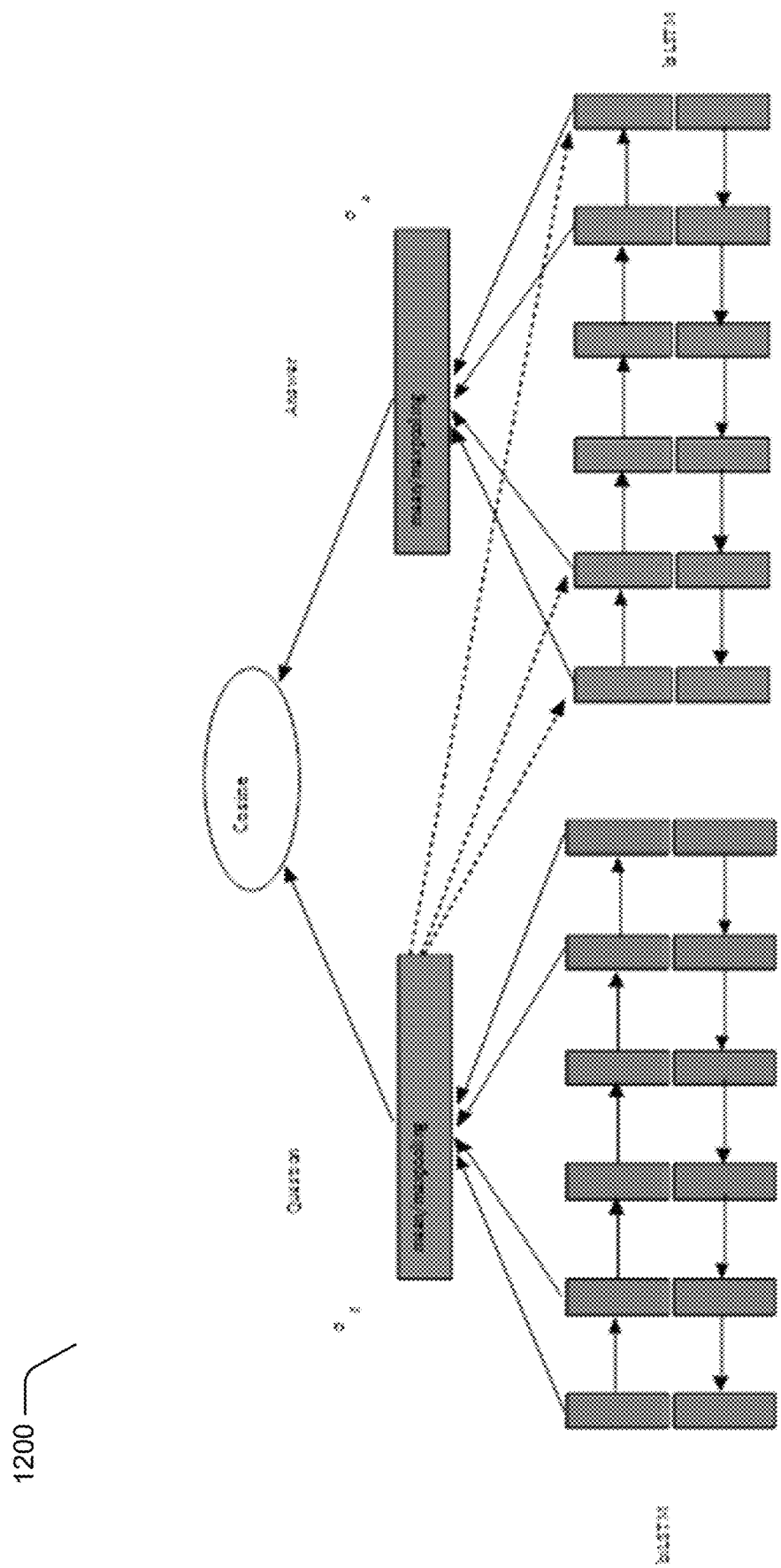
FIG. 12 illustrates a flow chart indicating question answering performed by the system using LSTM/CNN with attention, according to an example embodiment of the present disclosure.

FIG. 12 illustrates a flow chart 1200 indicating question answering performed by the system 100 using LSTM/CNN with attention, according to an example embodiment of the present disclosure. Therefore, in this technique, the system 100 may leverage background information to determine the correct response to the question.

Deep Inferencing Technique

In this technique, the system 100 approach the processing of the question based on an end result. The system 100 may encode a natural language question as a logical code. The encoded question may then be dynamically added to an overall logical knowledge base, which may have an accounting knowledge. A question stem may be as follows:

```
"company('Eagle Sporting Goods').
inventory_of('Eagle Sporting Goods', 2500000).
receivables_of('Eagle Sporting Goods', 2000000).
payables_deferral_period_of('Eagle Sporting Goods',
    time_amount(30,days)).
sales_per_day_of('Eagle Sporting Goods', 100000).
cost_of_sales_per_day_of('Eagle Sporting Goods', 50000).
focal_company_of(Q7, 'Eagle Sporting Goods') .
narrow_query_property_of(Q7, cash_conversion_period_of)"
```

Further, the responses to the question may be as follows:

```
"answer_choice(Q7, a, time_amount(100, days)) .
answer_choice(Q7, b, time_amount( 60, days)) .
answer_choice(Q7, c, time_amount( 50, days)) .
answer_choice(Q7, d, time_amount( 40, days)) .
```

In an example embodiment, a natural language sentence may be "The inventory conversion period is equal to average inventory divided by cost of goods sold per day." The system 100 may encode the logical code as:

```
"Rule R6:
inventory_conversion_period_of(?company,
time_amount(?inventory_conversion_period, days)) :-
average_inventory_of(?company, ?average_inventory) \and
cost_of_sales_per_day_of(?company,
    ?cost_of_sales_per_day)
\?inventory_conversion_period \is
?average_inventory / ?cost_of_sales_per_day "
```

In another example embodiment, a natural language sentence may be "Presume that average inventory is equal to inventory." The system 100 may encode the logical code as:

```
"Rule R7:
@{'presume average inventory is same as inventory'}
average_inventory_of(?company, ?inventory) :-
inventory_of(?company, ?inventory)"
```

Generalized Template Framework Technique

In some cases, the question may be similar to a previously presented question with a different context. The system 100 may use the generalized template framework techniques in such situations. The objective of using the generalized template framework technique by the system 100 may be to extend deep logical reasoning on substance of accounting, so as to also have textual entailment, based on understanding of restricted natural language questions, by mapping from natural language to logic, i.e., text interpretation.

The system 100 may use a new hybrid natural language-logic template language for knowledge representation. Further, the system 100 may perform NLP dependency parsing, co-reference, and named entity recognition and resolution. Further, the system 100 may use logic-based inferencing and transformation on template expressions, including quantification based on natural language determiners. Furthermore, the system 100 may use paraphrase knowledge, including from thesauri, ML, and any other encoding. The system 100 may use NLP information extraction, for example, based on co-occurrence.

In an example embodiment, the system 100 may use case-based reasoning while implementing the generalized template framework technique. Based on a target problem, the system 100 may retrieve cases relevant to solving of the target problem from the database 120. A case may include, but is not limited to, a problem, corresponding response or solution, and annotations indicative of details pertaining to deriving of the solution. The system 100 may select the cases to be retrieved based on k-means or any other unsupervised learning.

Figure 13:
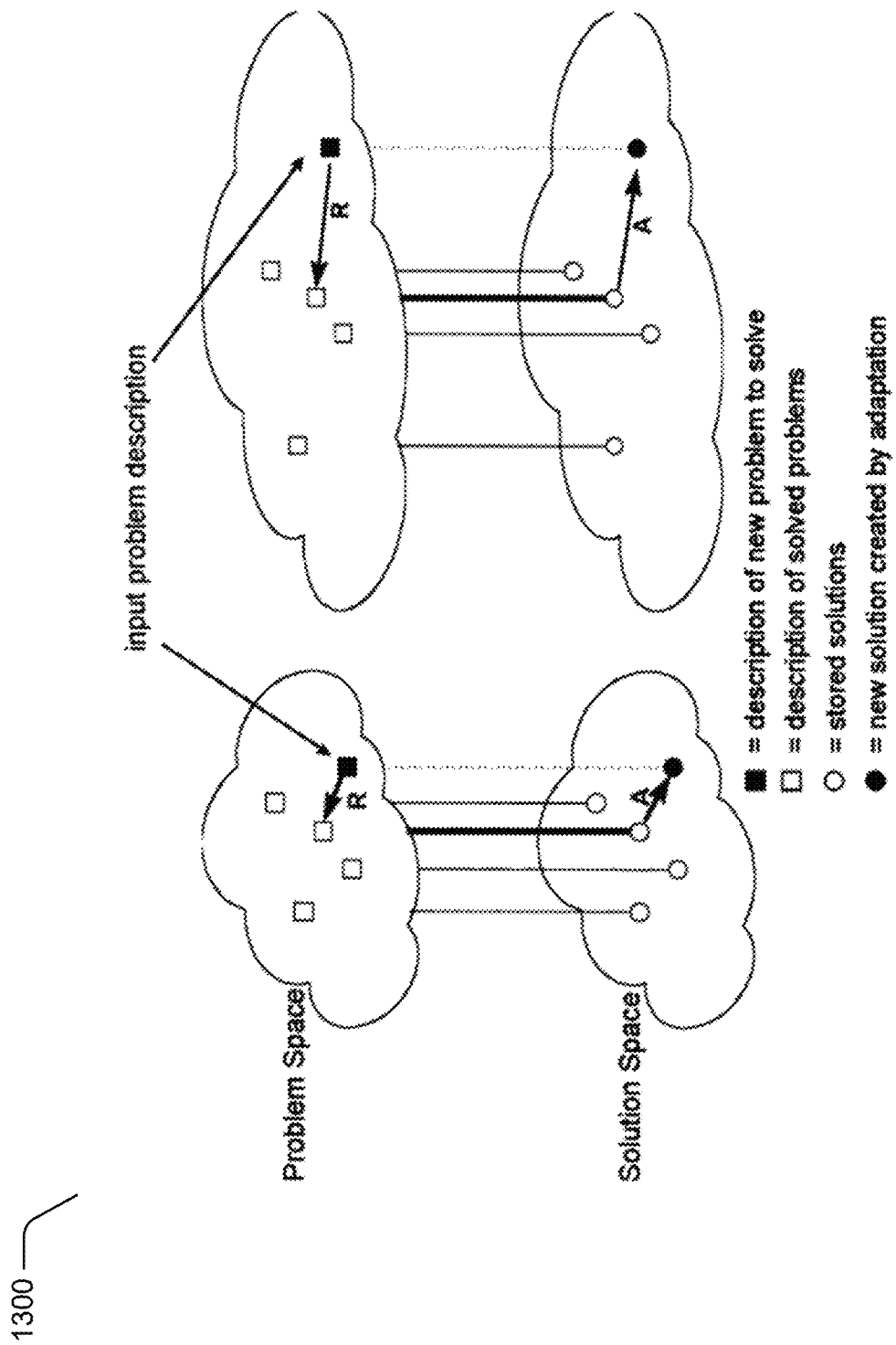
FIG. 13 illustrates a flow diagram depicting case-based reasoning while implementing a generalized template framework technique, according to an example embodiment of the present disclosure.

Further, the system 100 may map the solution of a previous case to the target problem. The mapping may include selecting the solution of the previous case and implementing the solution in accordance with the target problem. Following the mapping of the solution of the previous case to the target problem, the system 100 may test a solution of the target problem in the real world or a simulated environment. Based on outcome of the testing, the system 100 may revise the solution for the target problem. Once the solution is successfully implemented for the target problem, the system 100 may store the target problem along with the solution as a new case in the database 120. FIG. 13 illustrates a flow diagram 1300 depicting the case-based reasoning for implementing the generalized template framework technique, according to an example embodiment of the present disclosure.

In another example embodiment, the system 100 may use Computer Models of Analogy for implementing the generalized template framework technique. Based on the target problem, the system 100 may determine an analog similar to the target problem. The system 100 may then structurally align the target problem with the analog to generate a set of correspondences that indicate "what goes with what", candidate inferences that follow from the analogy, and a structural evaluation score that is indicative of a numerical measure alignment of the analog and the target problem.

Further, the system 100 may store results of comparison as an abstraction, producing a schema or other rule-like structure. In case of a partial match, the system 100 may modify one or both analogs to improve the matching.

For example, a physics problem may be as follows: "An astronaut on a planet with no atmosphere throws a ball upward from near ground level with an initial speed of 4.0 m/s. If the ball rises to a maximum height of 5.0 m, what is the acceleration due to gravity on this planet?"

The system 100 may recognize and instantiate distance-velocity under constant acceleration equation for ball's motion ($Vi^2=Vf^2-2ad$). Based on projectile motion, the velocity of the ball at maximum height may be 0 ($Vf=0$ m/s). Further, based on the projectile motion and lack of atmosphere, the system 100 may determine a value of the acceleration on the ball as gravitational force of the planet, i.e., ($a=g$). Because the ball is thrown near the ground, the system 100 may determine the height of the ball as equal to distance travelled by the ball during upward motion ($d=h$, given as 5.0 meters). The system 100 may then apply previous steps to solve the distance-velocity equation for the acceleration ($g=1.6$ m/s/s).

In an example embodiment, the system 100 may use textual entailment for implementing the generalized template framework technique. The system 100 may generate a corpus, which preserves logical properties. For example, for statements such as "Oracle had fought to keep the forms from being released" and "Oracle released a confidential document", the system 100 may determine relationship s as 'neutral." In another example, the system 100 may determine a relationship between "A motorcycle rider is standing up on the seat of a white motorcycle" and "No motorcycle rider is standing up on the seat of a motorcycle" as "contradiction." Further, the system 100 may determine relationship between "John said Bill had hurt himself." and "John said Bill had been hurt." as "entailment."

In one example, the system 100 may determine relationship between "Offeror mails a written offer to offeree stating that acceptance is valid only if received by the offeror within ten days. Offeree mails back the acceptance within ten days but it arrives late." and "The acceptance is late." as "entailment." In a further example, the system 100 may determine relationship between "This offer is only available to people 18 years of age and older. Carlos is 17. Carlos heard the offer." And "This offer is not available to Carlos." as "entailment." In yet another example, the system 100 may determine relationship between "D advertises a reward of $100 for the return of his pet dog. G, unaware of the offer, returns D's dog." And "G did not have knowledge of the offer." as "entailment."

Topic-Specific Technique

Figure 14:
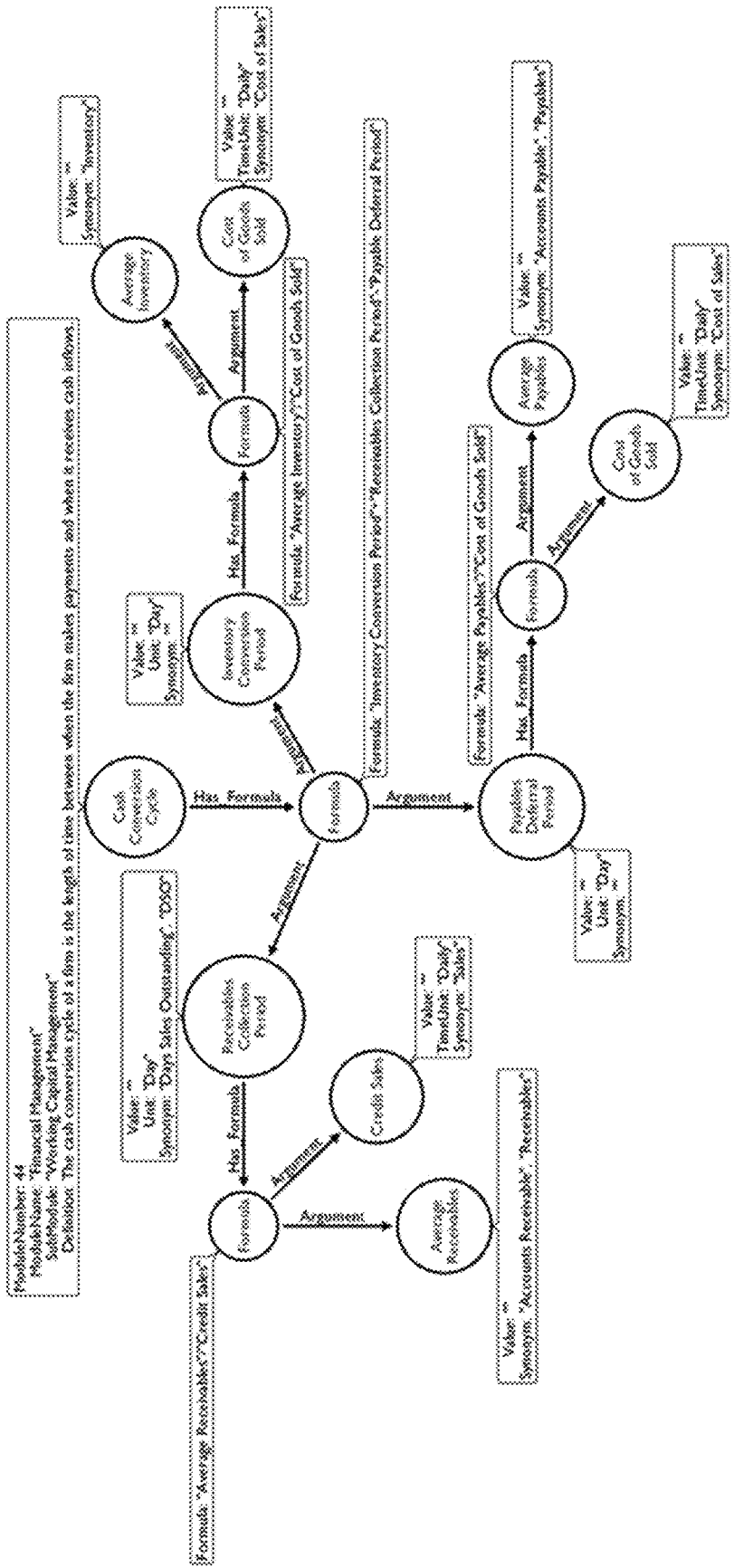
FIG. 14 illustrates a nodal graph generated by the system 100 for a topic of the accounting domain, according to an example embodiment of the present disclosure.

FIG. 14 illustrates a nodal graph 1400 generated by the system 100 for a topic of the accounting domain, according to an example embodiment of the present disclosure. The topic may be from a module "financial management" and a sub-module "Working capital management." The topic may further be "cash conversion cycle." The cash conversion cycle of a firm is indicative of a length of time between when the firm makes a payment and when it receives cash inflows.

The nodal graph 1400 may indicate the cash conversion cycle of an organization. The cash conversion cycle may be understood as a length of time between payment by the organization and receipt of cash inflow. In an example embodiment, the conversion cycle may include, but is not limited to, receiving materials from a supplier, paying the supplier, finishing goods and selling the goods, and collecting receivables.

In an example embodiment, the cash conversion cycle may include, but is not limited to, an inventory conversion period, a receivable collection period, and a payable deferral period. The inventory conversion period may be indicative of an average time for converting materials into finished goods and selling the finished goods. In an example embodiment, the inventory conversion period may be determined based on an average inventory and a cost of goods sold per day.

Further, the receivable collection period may be indicative of an average time required to collect amounts that are receivable. In an example embodiment, the receivable collection period may be determined based on average receivables and credit sales per day.

The payable deferrable period may be indicative of an average length of time between purchase of the materials and associated labor, and payment of cash to them. In an example embodiment, the payable deferrable period may be determined based on average payables and purchases per day. In another example embodiment, the payable deferrable good may be determined based on the average payables and a cost of goods sold over a year.

Therefore, the system 100 may determine the cash conversion cycle, i.e., the time period from payment of the material and the associated labor to collection of cash from the sale of goods, based on at least one of the inventory conversion period, the receivable collection period, and the payable deferral period. In an example, where the inventory conversion period, the receivables conversion period, and the payables deferral period are 91 days, 27 days, and 30 days, respectively, the system 100 may determine the cash conversion cycle as 88 days, i.e., 91+27−30.

Referring back to FIG. 2, following the generation of answers or responses by using one of the abovementioned techniques, the system 100 may rank the answers at the block 214. Further, the system 100 may determine the correct response, based on the ranking at the block 216.

In an example embodiment, the system 100 may build knowledge models indicative of the block 220. The knowledge models may be generated based on information extracted from the source indicated by the block 218. The source may include, but is not limited to, source documents, accounting textbooks, and previous CPA exams. The source documents may further relate, but is not limited to, to legislation, UCC, and IRS code.

The system 100 may build the knowledge models by extracting search indices, such as lucene and SoIr. The system 100 may then extract statistical language models, for example, n-gram and PMI, and CPA models through deep learning. Further, the system 100 may encode inferencing sentences and generalized templates from knowledge sources.

In an example embodiment, the system 100 may generate the knowledge representations, based on the knowledge models and execution of the techniques to providing the answer to the question.

In one example, a question panel having one or more questions may be presented to the user 116. The system 100 may then detect the topic related to the question, and select a knowledge graph of the detected topic. The knowledge graph may include a number of nodes interconnected with each other based on relationships among them. The knowledge graph may include a node for the cash conversion cycle. By selecting any of the nodes, the system 100 may display details pertaining to the node which may include, but are not limited to node description, formula of the node, and at least one parameter associated with the node. In an example embodiment, the formula for "cash conversion cycle" node may be "inventory conversion period+ receivable collection period− payable period." The system 100 may use this formula for providing an answer to the question relating to the topic of cash conversion cycle. The system 100 may extract the formula from the sources 218, such as a text book. When the question relates to cash conversion cycle, the system 100 may refer to the knowledge graph relating to the cash conversion cycle to provide the answer to the question.

Further, based on the nodes in the knowledge graph, the system 100 may generate rules for processing of the question and the corresponding potential responses. For example, although the system 100 may not have details pertaining to the cash conversion cycle, the system 100 may retrieve information pertaining to three parameters as mentioned above associated with the cash conversion cycle. Based on values of these three parameters, the system 100 may determine a value of the cash conversion cycle.

The values of the parameters may further be used by the system 100 to generate rules for processing of the question and the potential answers. The system 100 may accordingly determine the correct response or answer to the question.

In an example embodiment where the question is a factoid question, the system 100 may use PMI to determine the correct response. By using PMI, the system 100 may detect co-occurrence of words from the question and potential responses in a text-book source. The system 100 may also detect co-occurrence of a pair of words from the question within the potential responses.

In detail, the system 100 may extract a portion of the text book that includes or discusses the question. The portion may then be disintegrated into multiple parts, for example, in form of pairs of words. The system 100 may detect frequency of occurrence of the pairs of words in the portion. Accordingly, the system 100 may assign scores to each of the potential responses. Further, based on a nature of the question, for example, positive or negative tone, the system 100 may select the correct response.

Figure 15:
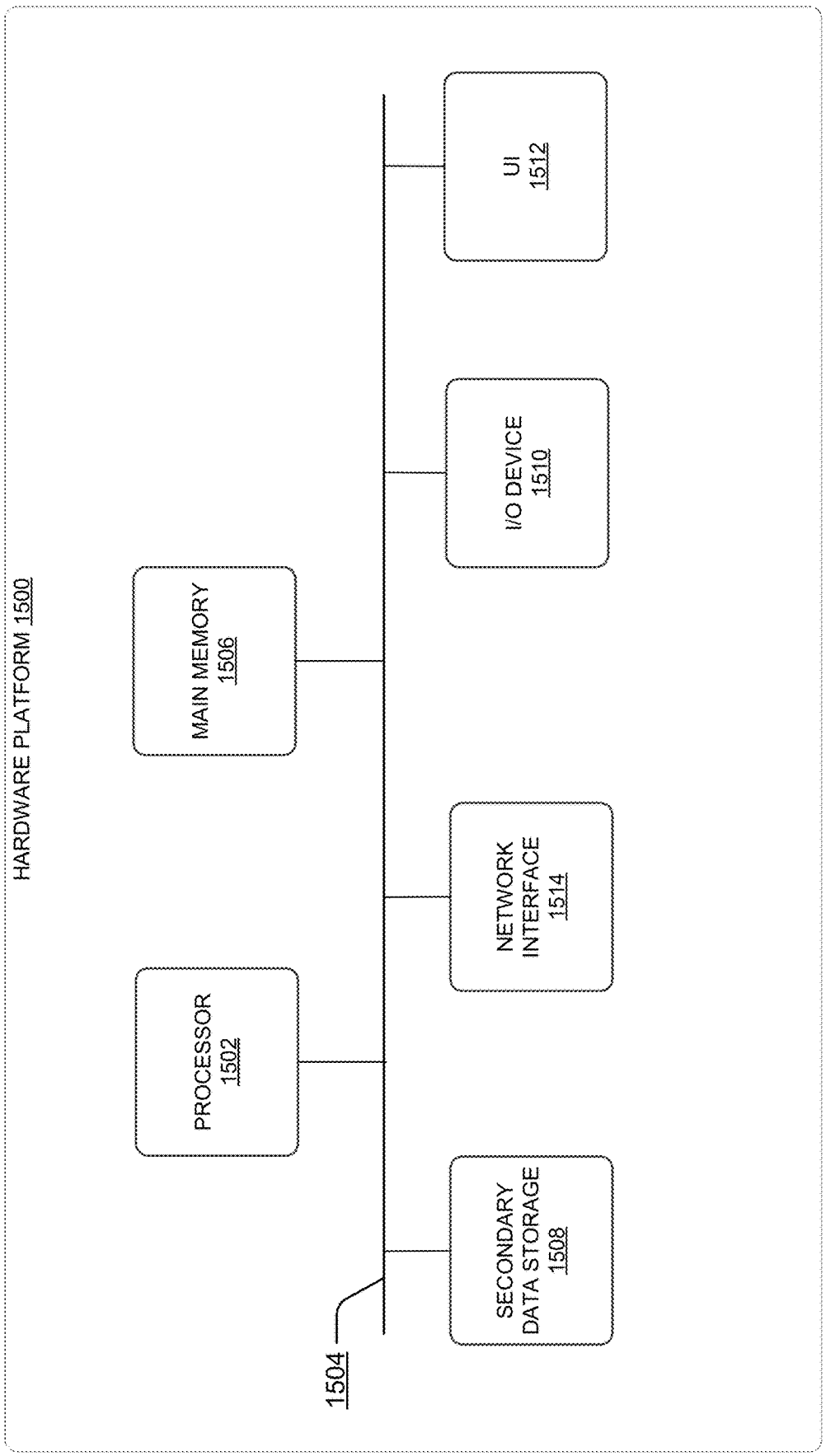
FIG. 15 illustrates a hardware platform for implementation of the system, according to an example embodiment of the present disclosure.

FIG. 15 illustrates a hardware platform 1500 for implementation of the system 100, according to an example of the present disclosure. In an example embodiment, the hardware platform 1500 may be a computer system 1500 that may be used with the examples described herein. The computer system 1500 may represent a computational platform that includes components that may be in a server or another computer system. The computer system 1500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1500 may include a processor 1502 that may implement or execute machine readable instructions performing some or all of the methods, functions, techniques and/or other processes described herein. Commands and data from the processor 1502 may be communicated over a communication bus 1504. The computer system 1500 may also include a main memory 1506, such as a random access memory (RAM), where the machine readable instructions and data for the processor 1502 may reside during runtime, and a secondary data storage 1508, which may be non-volatile and stores machine readable instructions and data. The memory 1506 and data storage 1508 are examples of non-transitory computer readable mediums. The memory 1506 and/or the secondary data storage may store data used by the system 100, such as an object repository including web objects, configuration data, test data, etc.

The computer system 1500 may include an Input/Output (I/O) device 1510, such as a keyboard, a mouse, a display, etc. A user interface (UI) 1512 can be a communication device that provides textual and graphical user interfaces to the user 116 of the system 100. The UI 1512 may operate with I/O device 1510 to accept from and provide data to a user. The computer system 1500 may include a network interface 1514 for connecting to a network. Other known electronic components may be added or substituted in the computer system. The processor 1502 may be designated as a hardware processor. The processor 1502 may execute various components of the system 1502 described above and perform the methods described below.

Figure 16:
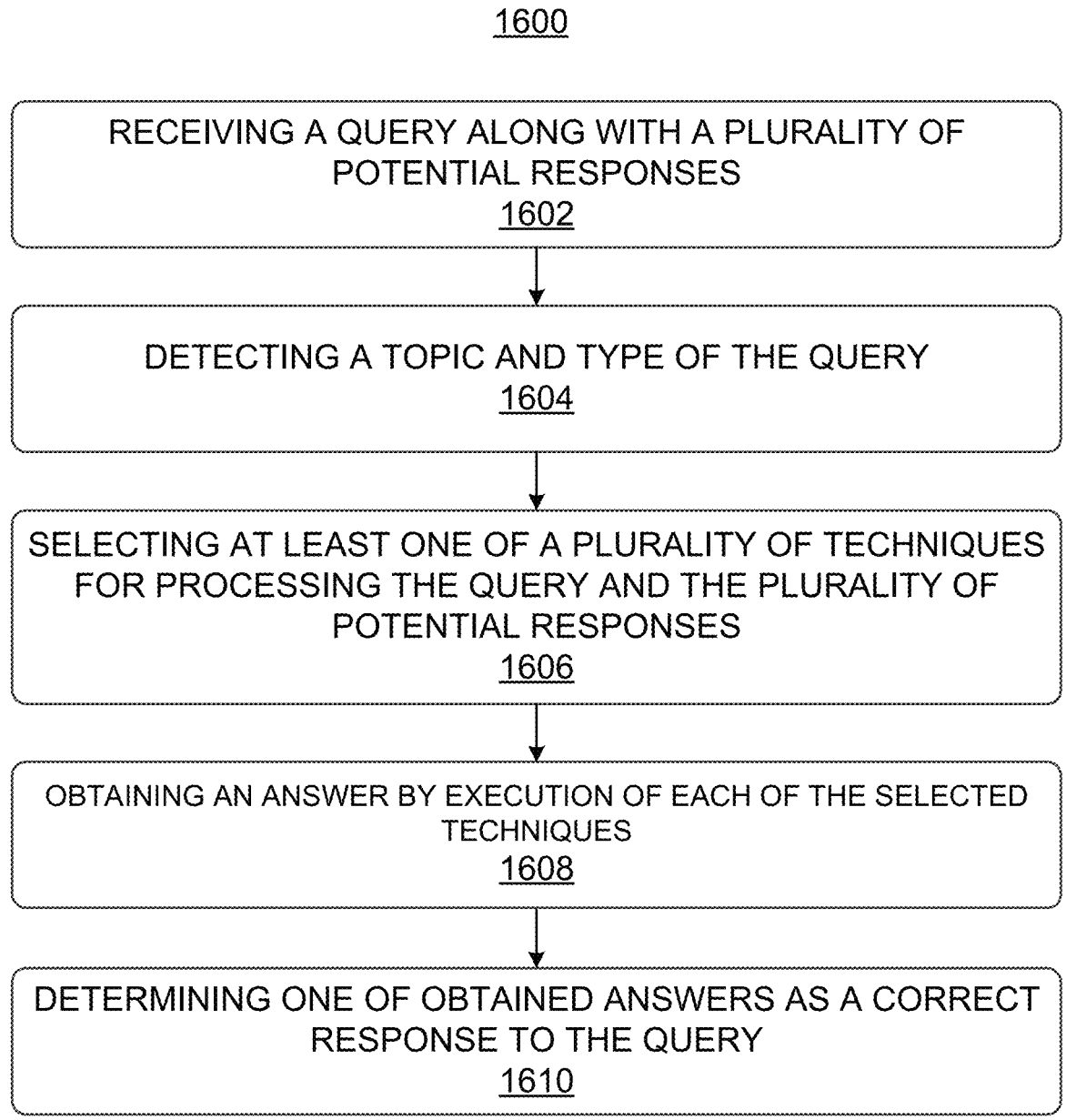
FIG. 16 illustrates a computer-implemented method for determination of a response to a query, according to an example embodiment of the present disclosure.

FIG. 16 illustrates a computer-implemented method 1600 for determining the response to the query depicting functionality of the system 100, according to an example embodiment of the present disclosure. The computer-implemented method 1600, hereinafter referred to as method 1600, may be executed by at least one processor 1502. For the sake of brevity, construction and operational features of the system 100 which are already explained in detail in the description of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and FIG. 15 are not explained in detail in the description of FIG. 16.

At 1602, the method 1600 commences with receiving the query along with the potential responses to the query. In an example embodiment, the receiver 102 of the system 100 may receive the query along with the potential responses.

At 1604, the method 1600 includes detecting a topic and a type of the query, based on information extracted from text and structure of the query and the potential responses. The query may be one of a factoid query, a computational query, and a combination of both. In an example embodiment, the detector 106 of the system 100 may detect the topic and the type of the query.

At 1606, the method 1600 includes selecting at least one of the techniques for processing the query and the potential responses, based on the topic and the type of the query. The techniques may include, but are not limited to, the information retrieval technique, the n-gram association technique, the deep learning technique, the inferencing technique, the generalized template framework technique, and the topic-specific technique. In an example embodiment, the selector 108 of the system 100 may select at least one of the techniques for processing the query and the potential responses.

At 1608, the method 1600 includes obtaining the answer by execution of each of the selected techniques for processing the query and the plurality of potential responses along with the associated confidence score. The answer may be from among the potential responses. Further, the confidence score is indicative of an accuracy of the answer obtained by execution of a respective technique. In an example embodiment, the obtainer 112 of the system 100 may obtain the answer by execution of each of the selected techniques.

At 1610, the method 1600 includes determining one of the obtained answers as the correct response to the query, based on the comparison between confidence scores associated with the answers. In an example embodiment, the determination module 114 of the system 100 may determine one of the obtained answers as the correct response to the query.

In an example embodiment, a confidence score that is highest among confidence scores of the obtained answers is selected, and compared with the predefined threshold value for the confidence score. In an example embodiment, when the highest confidence score is above the predefined threshold value, the answer associated with the highest confidence score may be determined as the correct answer to the query.

In an alternate example embodiment, when the highest confidence score is below the predefined threshold value, at least one request for obtaining the additional information on at least one of the query and the potential responses may be generated. The request may be in form of at least one the question to the user 116 and the confirmation from the user 116.

In an example embodiment, the user response to the request may be received. Based on the user response, an updated answer may be obtained by execution of each of the selected techniques for processing the query and the potential responses. The updated answer may be from among the potential responses. Further, an updated confidence score may be generated for each updated answer obtained by execution of each of the selected techniques. Subsequently, one of the updated answers may be determined as a correct response to the query, based on the comparison between the updated confidence scores associated with updated answers.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system for determining a response to a query; the system comprising:
 a processor;
 a receiver in communication with the processor, to receive a query along with a plurality of potential responses to the query;
 a detector in communication with the receiver to detect a topic and a type of the query, based on information extracted from text and structure of the query and the plurality of potential responses, wherein the query is one of a factoid query, a computational query, or a combination thereof;
 a selector in communication with the detector to select a first set of techniques for processing the query and the plurality of potential responses, based on the topic and the type of the query, wherein the first set of techniques includes at least one technique from a plurality of techniques, the plurality of techniques including an information retrieval technique, a n-gram association technique, a deep learning technique, an inferencing technique, a generalized template framework technique, and a topic-specific technique;
 an obtainer in communication with the selector to obtain an answer by execution of each of the at least one technique included in the first set of techniques for processing the query and the plurality of potential responses along with an associated confidence score, wherein the answer is from among the plurality of responses and the confidence score is indicative of an accuracy of the answer obtained by execution of a respective technique;
 a determinator in communication with the detector and the obtainer to determine one of obtained answers as a correct response to the query, based on a comparison between confidence scores associated with the answers; and
 a learner in communication with the receiver and the determinator to:
 receive a confirmation indicative of correctness of the correct response from a user; and
 store the confirmation along with the correct response for assisting in processing of subsequent queries,
 wherein the selector is to further select a second set of techniques for processing the query and the plurality of potential responses based on the confirmation received from the user, the second set of techniques including at least one another technique from the plurality of techniques that is different from the first set of techniques.

2. The system of claim 1 further comprising the determinator to:
 select a confidence score that is highest among confidence scores of the obtained answers;
 compare the highest confidence score with a predefined threshold value for the confidence score; and
 determine the answer associated with the highest confidence score as the correct response to the query, when the highest confidence score is above the predefined threshold value.

3. The system of claim 1, wherein to receive the response from the user the determinator is to:
 select a confidence score that is highest among confidence scores of the obtained answers;
 compare the highest confidence score with a predefined threshold value for the confidence score; and
 generate at least one request for receiving the response from the user on at least one of the query and the plurality of potential responses, when the highest confidence score is below the predefined threshold value, wherein the at least one request is in a form of at least one of a question to the user and a confirmation from the user.

4. The system of claim 3, wherein
 the obtainer is to obtain an updated answer by execution of the second set of techniques for processing the query and the plurality of potential responses based on the user response, wherein the updated answer is from among the plurality of potential responses, wherein the system further comprises
 a generator to generate an updated confidence score for each updated answer obtained by execution of each of the techniques included in the second set of techniques, wherein the determinator is to determine one of the updated answers as a correct response to the query, based on a comparison between updated confidence scores associated with updated answers.

5. The system of claim 1 further comprising an extractor in communication with the receiver to extract the information from the query and the plurality of potential responses based on the text and the structure of the query and the plurality of potential responses.

6. The system of claim 5, wherein information is extracted by using at least one Natural Language Processing (NLP) technique.

7. The system of claim 6, wherein the NLP technique includes at least one of a dependency parsing technique and a constituency parsing technique.

8. The system of claim 1 further comprising a generator in communication with the selector and the obtainer to generate the confidence score for each answer obtained by execution of each of the at least one technique included in the first set of techniques.

9. A system for determining a response to a query, the system comprising:
 a processor:
 a receiver in communication with the processor, to receive a query along with a plurality of potential responses to the query;
 an extractor in communication with the receiver to extract information from the query and the plurality of potential responses based on text and structure of the query and the plurality of potential responses;
 a detector in communication with the extractor to detect a topic and a type of the query, based on the extracted information, wherein the query is one of a factoid query, a computational query, or a combination thereof;
 a selector in communication with the detector to select a first set of techniques for processing the query and the plurality of potential responses, based on the topic and the type of the query, wherein the first set of techniques includes at least one technique from a plurality of techniques, the plurality of techniques including an information retrieval technique, a n-gram association technique, a deep learning technique, an inferencing technique, a generalized template framework technique, and a topic-specific technique;

an obtainer in communication with the selector to obtain an answer by execution of each of the at least one technique included in the first set of techniques for processing the query and the plurality of potential responses, wherein the answer is from among the plurality of potential responses;

a generator in communication with the selector and the obtainer to generate a confidence score for each answer obtained by execution of each of the at least one technique included in the first set of techniques, wherein the confidence score is indicative of an accuracy of the answer obtained by execution of a respective technique;

a determinator in communication with the extractor, the detector, and the obtainer to determine one of obtained answers as a correct response to the query, based on a comparison between confidence scores associated with the answers; and a learner in communication with the receiver and the determinator to:

receive a confirmation indicative of correctness of the correct response from a user; and store the confirmation along with the correct response for assisting in processing of subsequent queries, wherein the selector is to further select a second set of techniques for processing the query and the plurality of potential responses based on the confirmation received from the user, the second set of techniques including at least one another technique from the plurality of techniques that is different from the first set of techniques.

10. The system of claim 9 further comprising the determinator to:

select a confidence score that is highest among confidence scores of the obtained answers;

compare the highest confidence score with a predefined threshold value for the confidence score; and determine the answer associated with the highest confidence score as the correct response to the query, when the highest confidence score is above the predefined threshold value.

11. The system of claim 9, wherein to receive the response from the user the determinator is to:

select a confidence score that is highest among confidence scores of the obtained answers;

compare the highest confidence score with a predefined threshold value for the confidence score; and generate at least one request for receiving the response from the user on at least one of the query and the plurality of potential responses, when the highest confidence score is below the predefined threshold value, wherein the at least one request is in a form of at least one of a question to the user and a confirmation from the user.

12. The system of claim 11, wherein the obtainer is to obtain an updated answer by execution of the second set of techniques for processing the query and the plurality of potential responses, based on the user response, wherein the updated answer is from among the plurality of potential responses, the generator to generate an updated confidence score for each updated answer obtained by execution of each of the techniques included in the second set of techniques, and the determinator is to determine one of the updated answers as a correct response to the query, based on a comparison between updated confidence scores associated with the updated answers.

13. The system of claim 9, wherein the information is extracted by using at least one Natural Language Processing (NLP) technique.

14. The system of claim 13, wherein the NLP technique includes at least one of a dependency parsing technique and a constituency parsing technique.

15. A computer-implemented method, for determining a response to a query, executed by at least one processor, the method comprising:

receiving, by the at least one processor, a query along with a plurality of potential responses to the query;

detecting, by the at least one processor, a topic and a type of the query, based on information extracted from text and structure of the query and the plurality of potential responses, wherein the query is one of a factoid query, a computational query, or a combination thereof;

selecting, by the at least one processor, a first set of techniques for processing the query and the plurality of potential responses, based on the topic and the type of the query, wherein the first set of techniques includes at least one technique from a plurality of techniques, the plurality of techniques including an information retrieval technique, a n-gram association technique, a deep learning technique, an inferencing technique, a generalized template framework technique, and a topic-specific technique;

obtaining, by the at least one processor, an answer by execution of each of the at least one technique included in the first set of techniques for processing the query and the plurality of potential responses along with an associated confidence score, wherein the answer is from among the plurality of responses and the confidence score is indicative of an accuracy of the answer obtained by execution of a respective technique;

determining, by the at least one processor, one of obtained answers as a correct response to the query, based on a comparison between confidence scores associated with the answers, receiving, by the at least one processor, a confirmation indicative of correctness of the correct response from a user;

storing, by the at least one processor, the confirmation along with the correct response for assisting in processing of subsequent queries; and selecting, by the at least one processor, a second set of techniques for processing the query and the plurality of potential responses based on the confirmation received from the user, the second set of techniques including at least one another technique from the plurality of techniques that is different from the first set of techniques.

16. The method of claim 15 further comprising:

selecting, by the at least one processor, a confidence score that is highest among confidence scores of the obtained answers;

comparing, by the at least one processor, the highest confidence score with a predefined threshold value for the confidence score; and determining, by the at least one processor, the answer associated with the highest confidence score as the correct response to the query, when the highest confidence score is above the predefined threshold value.

17. The method of claim 16 further comprising:
selecting, by the at least one processor, a confidence score that is highest among confidence scores of the obtained answers;
comparing, by the at least one processor, the highest confidence score with a predefined threshold value for the confidence score; and
generating, by the at least one processor, at least one request for receiving the response from the user on at least one of the query and the plurality of potential responses, when the highest confidence score is below the predefined threshold value, wherein the at least one request is in a form of at least one of a question to the user and a confirmation from the user.

18. The method of claim 17 further comprising:
obtaining, by the at least one processor, an updated answer by execution of second set of techniques for processing the query and the plurality of potential responses based on the user response, wherein the updated answer is from among the plurality of potential responses;
generating, by the at least one processor, an updated confidence score for each updated answer obtained by execution of each of the techniques included in the second set of techniques; and
determining, by the at least one processor, one of the updated answers as a correct response to the query, based on a comparison between updated confidence scores associated with updated answers.

* * * * *